United States Patent [19]

Lee

[11] Patent Number: 5,315,596
[45] Date of Patent: May 24, 1994

[54] DIGITAL MULTIPLEXER WITH LOGICALLY ALLOCATABLE CHANNELS AND BIT RATES

[75] Inventor: Townes T. H. Lee, Regina, Canada

[73] Assignee: Canadian Institute for Broadband & Information Network Technologies, Inc. (CIBINT), Regina, Canada

[21] Appl. No.: 870,456

[22] Filed: Apr. 17, 1992

[51] Int. Cl.$^5$ .............................................. H04J 3/04
[52] U.S. Cl. ...................................... 370/112; 370/84
[58] Field of Search ...................... 370/112, 102, 58.1, 370/59, 84, 63, 64, 99; 307/243, 244; 328/153, 154

[56] References Cited

U.S. PATENT DOCUMENTS

| | | | |
|---|---|---|---|
| 4,157,458 | 6/1979 | Roche | 370/112 |
| 4,330,856 | 5/1982 | Takasaki et al. | 370/102 |
| 4,345,323 | 8/1982 | Chang | 370/112 |
| 4,410,980 | 10/1983 | Takasaki et al. | 370/102 |
| 4,744,082 | 5/1988 | Fujimura et al. | 370/112 |
| 4,914,655 | 4/1990 | Johannes et al. | 370/112 |

Primary Examiner—Douglas W. Olms
Assistant Examiner—Ajit Patel
Attorney, Agent, or Firm—Antonelli, Terry, Stout & Kraus

[57] ABSTRACT

A data multiplexer system is comprised of a space division multiplexer having a plurality of space divided (SDM) input channels, each SDM channel adapted to carry a first number of time divided TDM channels at a first clock rate; at least one digital data source; apparatus for generating a second clock rate derived from the first clock rate, which is at the clock rate of the data source; apparatus for selecting data from the one source in synchronism with the second clock rate; and apparatus for applying the selected data to at least one of the SDM channels; whereby data from a digital data source having a clock rate either the same or different from the clock rate of a TDM channel may be applied to and be carried by any SDM channel.

21 Claims, 37 Drawing Sheets

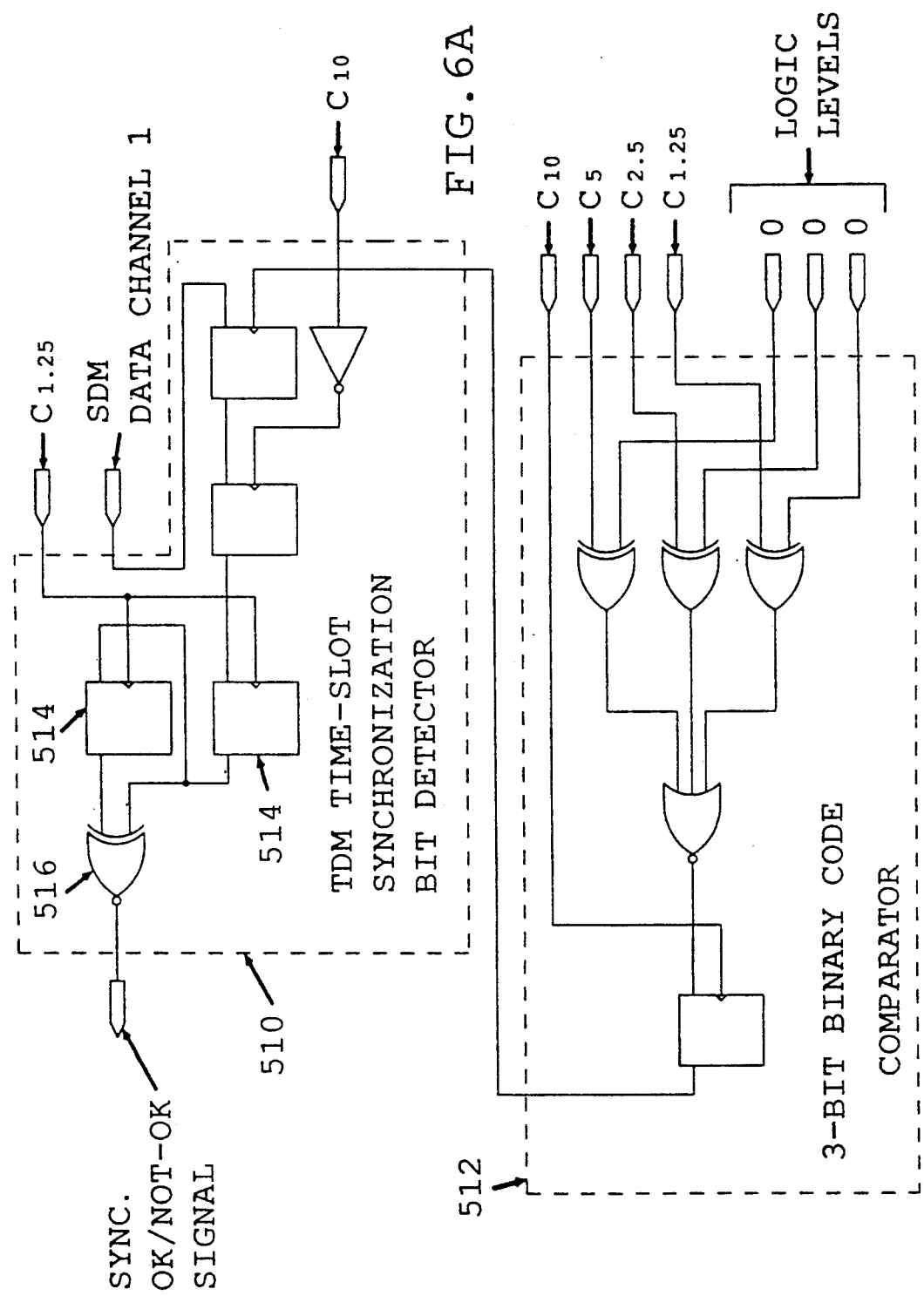

FIG. 11

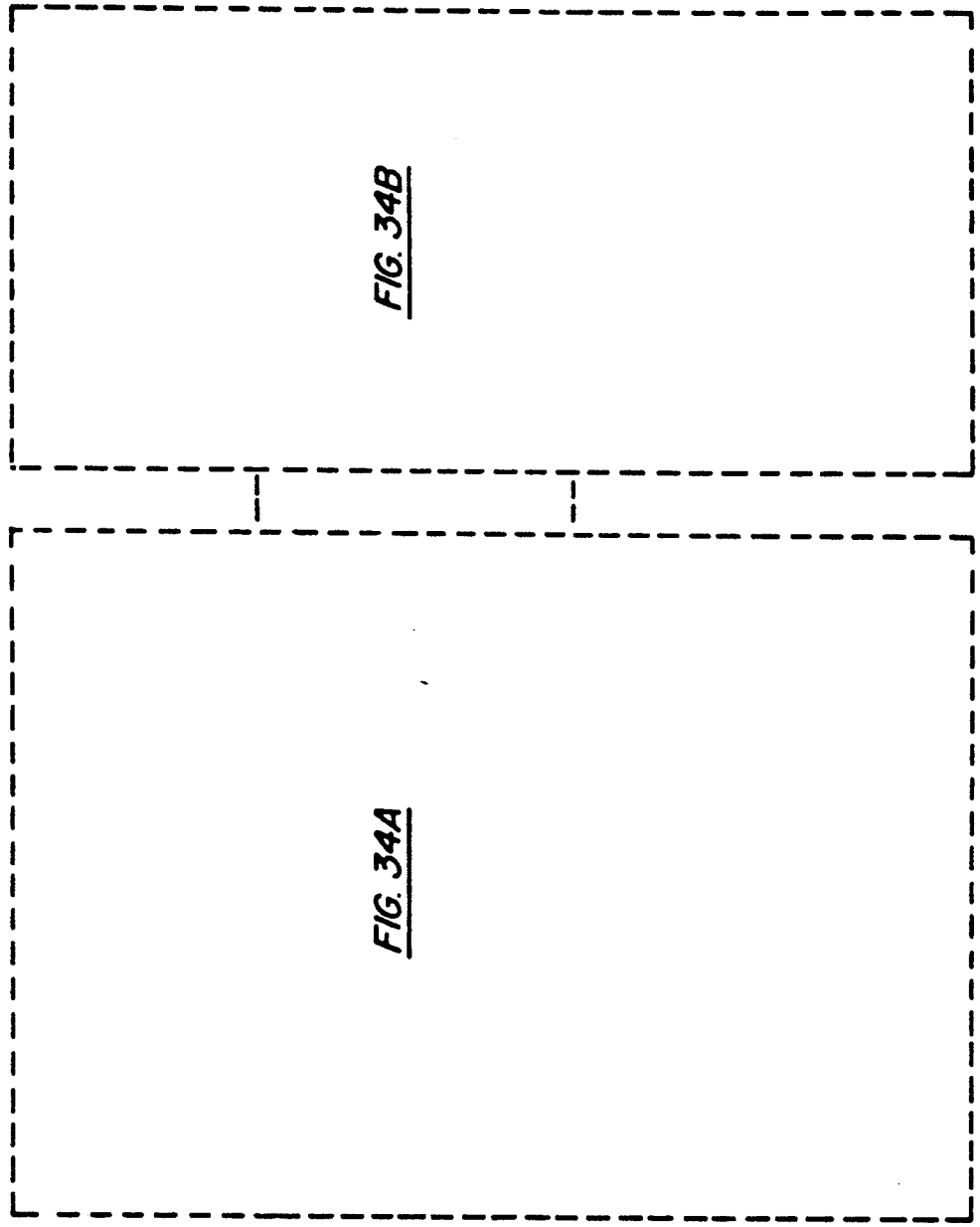

DIGITAL MULTIPLEXER WITH LOGICALLY ALLOCATABLE CHANNELS AND BIT RATES

FIELD OF THE INVENTION

This invention relates to digital multiplexer-demultiplexer systems having logically allocable data channels and bit rates.

BACKGROUND TO THE INVENTION

Needs have arisen for so-called intelligent buildings, factory and campus installations to accommodate the transmission of data at various bit rates such as those shown in Table 1.

TABLE 1

| EXAMPLE OF BIT RATES | | |
|---|---|---|
| BIT RATE | | APPLICATION |
| 1. | kb/s | Card Access Control Data Bus |
| 2. | kb/s | HVAC Data Bus |
| 19.2 | kb/s | RS-232C Personal Computer Network |
| B = 64. | kb/s | PBX Digital Telephone/Data |
| C = 16. | kb/s | BBX Data/Control |
| B + D = 144. | kb/s | BBX and ISDN |
| DS1 = 1.544 | Mb/s | Telephone/Data Trunk Line |
| 2.5 | Mb/s | Arcnet LAN |
| 10. | Mb/s | Ethernet LAN |
| 16. | Mb/s | IBM Token Passing LAN |

These various bit rates must be supported by a network in such installations because they interconnect the equipment that provides intelligence to the facility. A multiplexer-demultiplexer system is typically used in a network carrying data, which network must be able to support a wide range of bit rates, and to reconfigure quickly, and with minimum cost to accommodate such changes.

Three categories of multiplexer-demultiplexer systems are in common use. They are the synchronous, asynchronous, and asynchronous high speed over-sampling multiplexer-demultiplexer systems. Many variations are known but Table 2 summarizes the key features of some representative systems.

The multiplexer of a multiplexer-demultiplexer system is designed to combine a number of data signals present at the input channels by multiplex sampling the data signals and transmitting them as a serial bit stream. The demultiplexer extracts the samples from the bit stream and places them into the output channels that correspond to the input channels. The original data signals are then reconstructed and provided as the output signals.

TABLE 2

| MULTIPLEXER-DEMULTIPLEXER SYSTEMS | |
|---|---|
| MULTIPLEXER-DEMULTIPLEXER SYSTEMS | KEY FEATURES |
| Synchronous | 1. Clock frequency is supplied to the data signal source |
| | 2. Data signals have same bit rate |
| | 3. Data signals are in phase |
| | 4. Multiplex sampling is done synchronously |
| Asynchronous | 1. Data signal bit rate is lower than the specified operational bit rate |
| | 2. Bit-stuffing is used to match the data bit rate with the specified operational bit rate |
| | 3. Multiplex sampling is done synchronously |
| Asynchronous High Speed Over-Sampling | 1. Multiplex sampling rate is more than 10 times higher than the data signal bit rate |
| | 2. Data signals may have different bit rates and not be in phase |
| | 3. Multiplex sampling is done asynchronously |

The input data signals to a synchronous multiplexer-demultiplexer system usually have the same bit rate and they are arranged to be all in phase at the input of the multiplexer. For this purpose, a single clock frequency supplied by the multiplexer-demultiplexer system is used to generate the data signals.

The data signals are then multiplex sampled sequentially and the sampled bits transmitted as a serial bit stream which is the TDM (Time Division Multiplex) signal.

The demultiplexer reverses the multiplex sampling operation by separating out each data sample, and delivering a reconstructed data to the output channel that corresponds to the input channel at the multiplexer.

For the asynchronous multiplexer-demultiplexer system, the bit rate of an input data signal to the multiplexer is usually slightly lower than the specified operational bit rate of the input channel of a synchronous multiplexer-demultiplexer system.

The bit rate of the data signal is adjusted to the specified operational bit rate by a bit-stuffing operation which inserts a sufficient number of dummy bits to bring the data signal bit rate into agreement with the specified operational bit rate. The data signal clock frequency and electronic circuits including a bit-stuffing circuit and a stuff-bit indicator circuit are used to realize this agreement of bit rates.

If the data signal clock frequency is not available, a clock recovery circuit is used to reproduce the frequency. In order to identify and remove the stuff-bits at the demultiplexer, means for identifying the stuff-bits are transmitted to the demultiplexer as part of the TDM bit stream.

At the demultiplexer, the synchronously transmitted data signal samples including the stuff-bits, are demultiplexed into the output channels corresponding to the input channels. The stuff-bits are removed and the reconstructed data signals are supplied to the output channels at the original bit rate. To provide the clock frequency necessary to reproduce the original bit rate, a tracking clock generator is used.

Asynchronous high speed over-sampling multiplexer-demultiplexer systems operate on the principle of a high speed commutator and decommutator. The data signals are multiplex sampled by an electronic commutator at a rate 10 times or more higher than the highest bit rate of the data signals. An electronic decommutator is synchronized to the commutator to allow one-to-one correspondence between the multiplexed data channels and demultiplexed data channels.

It should be noted that a data channel in a synchronous multiplexer-demultiplexer system can be used as an asynchronous high speed over-sampling channel provided the bit rate of the data signal is approximately 1/10 or lower than the specified operational bit rate of the data channel.

Most synchronous multiplexer-demultiplexer systems cannot accommodate the wide range of data bit rates required in facilities such as intelligent buildings because of the fixed operational bit rates of the data channels.

If the data channels are used as asynchronous high speed over-sampling data channels, the cost-effectiveness of the system obviously suffers because of the inefficient use of the overall transmission capacity.

Reconfiguring a synchronous multiplexer-demultiplexer system to accommodate a change in the operational bit rate of a data channel and/or the number of data channels involves a major modification in the system, or, in most cases, a complete replacement of the system. The cost of such reconfigurations are prohibitive.

The same can be said of most asynchronous multiplexer-demultiplexer systems.

Asynchronous high speed over-sampling multiplexer-demultiplexer systems cannot have many high bit rate data channels because the operational bit rate will readily exceed 100 Mb/s. Such bit rates require high cost ECL and GaAs integrated circuits, and cost effectiveness of the system is significantly diminished.

Ideally, a multiplexer-demultiplexer system for a facility such as an intelligent building should support bit rates ranging from DC contact closures to above 10 Mb/s for LANs (Local Area Networks) such as the Ethernet.

SUMMARY OF THE PRESENT INVENTION

The present invention is a multiplexer-demultiplexer system with a multiplexer and corresponding demultiplexer that can multiplex transmit a plurality of data signals with a wide range of differing bit rates; can be utilized synchronously and/or asynchronously and/or in an asynchronous high speed over-sampling manner.

It has a plurality of SDM (Space Division Multiplex) data channels, each of which contains a multiplicity of TDM (Time Division Multiplex) sub-channels. One or more SDM data channels can carry signals from a plurality of data signal sources through suitable allocation of TDM sub-channels to the data signal sources. The bit rates of the data signals need not be the same.

Signals from a single data source can also be multiplex transmitted on one or more SDM data channels.

Interface cards are used to provide the connections between the data signal sources and the SDM data channels to facilitate the multiplexed transmission of a wide range of data signals with differing bit rates.

The present invention offers the flexibility of choosing, according to the transmission bit rate required by a given signal source, one or more SDM data channels by connection at the interface card socket, or by connections through wiring, or by suitable manual or processor operated switches on the interface card.

The present invention also provides the flexibility of choosing, according to the transmission bit rate required by a given signal source, one or more TDM sub-channels that are either on the same SDM data channel, or are spread among a multiplicity of SDM data channels, by a set of electronic logic signals applied by connections through wiring, or through suitable manual or processor operated switches on the interface card.

The connections and switches noted above can be used to select SDM and/or TDM sub-channels in a fixed manner, or manually, or electronically. Remote electronic selection by a processor is also possible as in the case where two sets of multiplexer-demultiplexer systems are used to establish a fully bidirectional transmission system.

For the purpose of remote automatic electronic selection (i.e. assignment) of the SDM data channels and/or TDM sub-channels, a unique electronic identifier code can be provided on the interface card by using electronic memories. By using the identifier code, the transmission bit rate of the data signal source or data receiver that is connected to the interface card can be accommodated automatically. An electronic identifier code for the position (i.e. socket number) of the interface card socket can also be provided to the electronic memory for the purpose of managing a network formed by a collection of multiplexer-demultiplexers systems.

The unique identifier code of the interface card and the socket number code can be transmitted to a remote processor that controls the SDM data channel and TDM sub-channel selections, through one of the TDM sub-channels in a fully bidirectional transmission system consisting of two sets of multiplexer-demultiplexer systems.

Thus the ability to select channels and bit rates, and to change them can be reduced to merely changing the switch closures of a group of switches, or replacing an interface card, or of controlling switch closures from a remote processor such as a microprocessor or personal computer.

In accordance with an embodiment of the invention, a data multiplexer-demultiplexer system is comprised of a space division multiplexer and demultiplexer each having a plurality of input SDM and output SDM data channels, each SDM data channel being adapted to carry a first number of TDM sub-channels at a first clock rate; and the following apparatus at the multiplexer; apparatus for multiplex sampling on to SDM data channels data signals from external sources, in synchronism with the first clock rate; Apparatus for generating a series of second clock rates derived from the first clock rate; apparatus for selecting one or more TDM sub-channels; apparatus for multiplex sampling into one or more selected TDM sub-channels data signals from external sources, in synchronism with one of the series of second clock rates; apparatus for applying the multiplex sampled data signals to one or more of the SDM data channels; and the following apparatus at the demultiplexer; apparatus to recover and regenerate the first clock rate; apparatus to generate a second series of clock rates from the regenerated first clock rate; apparatus at the demultiplexer to bring into and maintain synchronization of the series of second clock rates and TDM sub-channels, with those at the multiplexer; apparatus to select one or more SDM data channels in correspondence with the SDM data channel or channels selected at the multiplexer; apparatus for selecting one or more of the TDM sub-channels in correspondence with the TDM sub-channels selected at the multiplexer; apparatus for extracting one or more sample multiplexed data signals from the SDM data channel or channels, and/or TDM sub-channel or channels; apparatus for reconstructing the data signal or signals; whereby data signals may be applied to any of the multiplexer input SDM data channels and multiplex transmitted to the corresponding output SDM data channel and reproduced as the original data signal, and/or data signals can be applied to one or more TDM sub-channels on one or more input SDM data channels and multiplex transmitted to the corresponding TDM sub-channel or channels on the corresponding output SDM data channel or channels, and reproduced as the original data signal.

The present invention can be used as a synchronous multiplexer-demultiplexer system. For example, data signals that have bit rates corresponding to the first clock rate, or, one or more of the series of second clock rates can be multiplex transmitted synchronously through the system.

The present invention can also be used as an asynchronous multiplexer-demultiplexer system by using well known electronic methods such as bit-stuffing.

Furthermore, the present invention can also be used as an asynchronous high speed over-sampling multiplexer-demultiplexer system as well.

INTRODUCTION TO THE DRAWINGS

A better understanding of the invention will be obtained by reference to the detailed description below, in conjunction with the following drawings in which:

FIG. 6A and 6B are circuit diagrams that can be used to bring the TDM sub-channels at the demultiplexer into one-to-one correspondence with those at the multiplexer;

FIG. 11 is a circuit diagram of a demultiplex sampling circuit and data signal reconstruction circuit that can be used to form part of the embodiment of FIG. 8;

Figure 23:
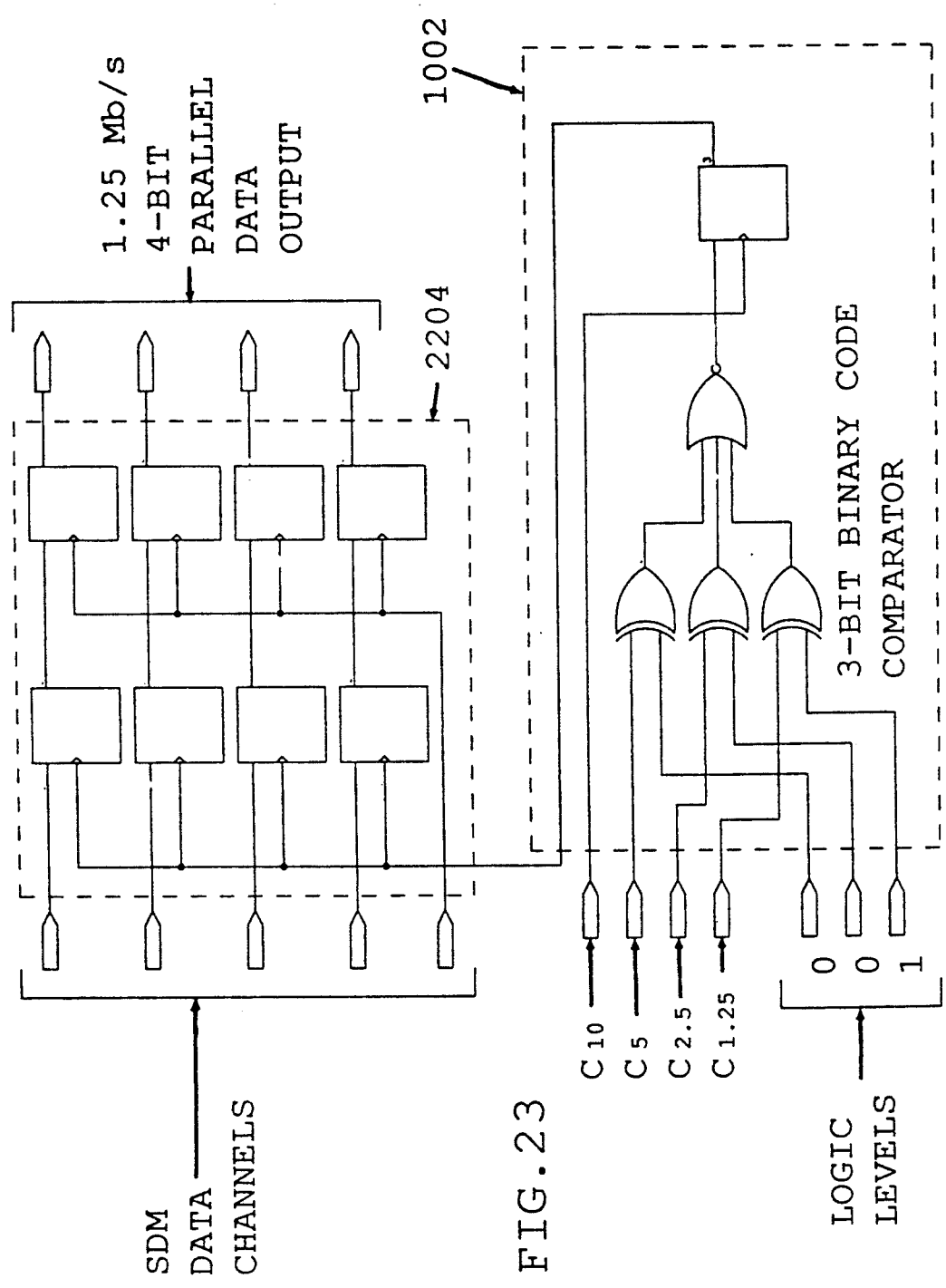
FIG. 23 is a circuit diagram of a demultiplex sampling circuit and data signal reconstruction circuit that can be used to form part of the embodiment of FIG. 22.

FIG. 23 is a block diagram illustrating a demultiplexer using a set of switches to allocate the SDM data channel in accordance with an embodiment of the invention; and FIG. 34 is a block diagram illustrating the manner in which SDM data channels and TDM sub-channels may be allocated automatically from a remote location by identifying the interface card type, and at the same time register the socket number of the interface card socket.

Figure 34A:
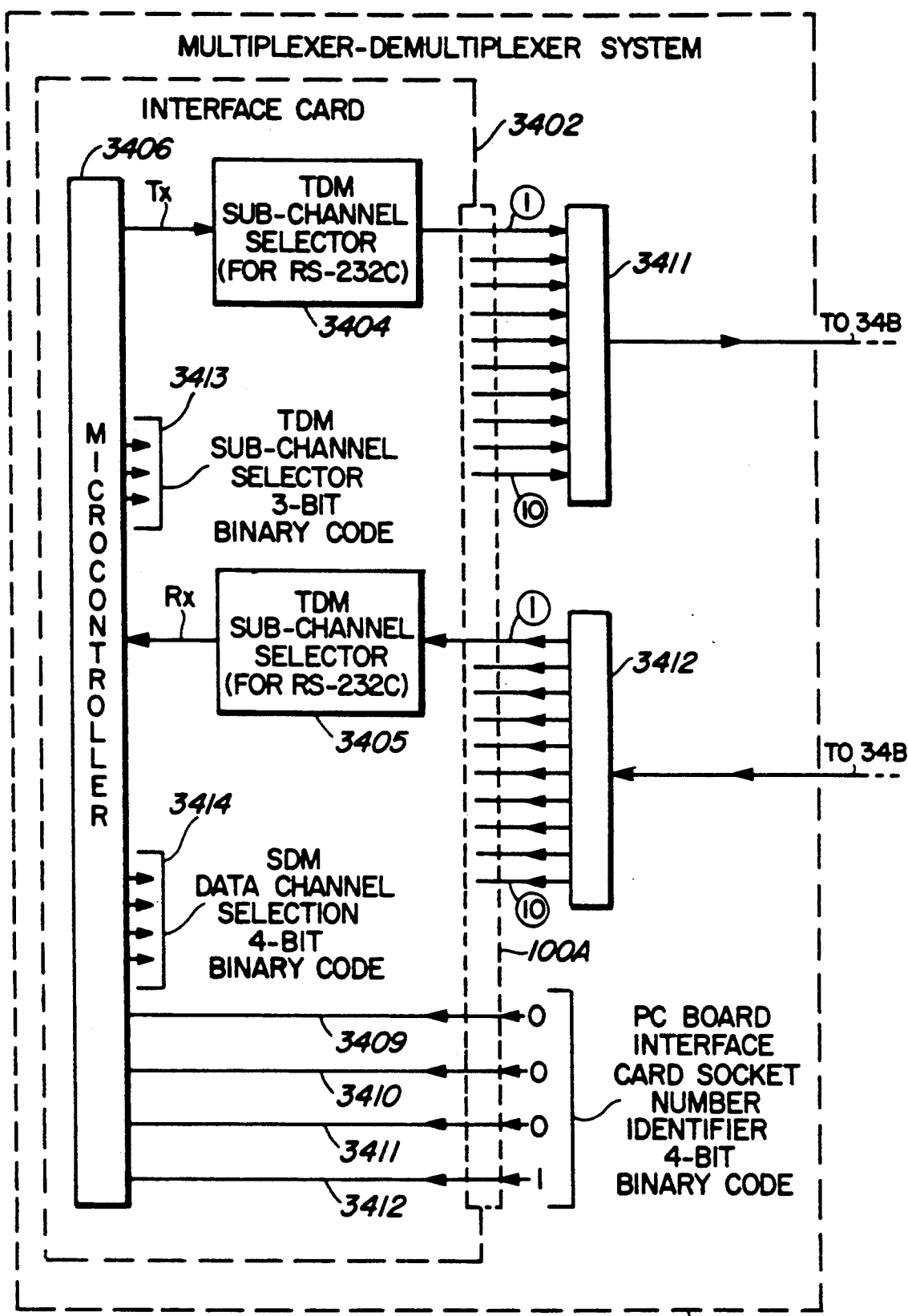
Figure 34B:
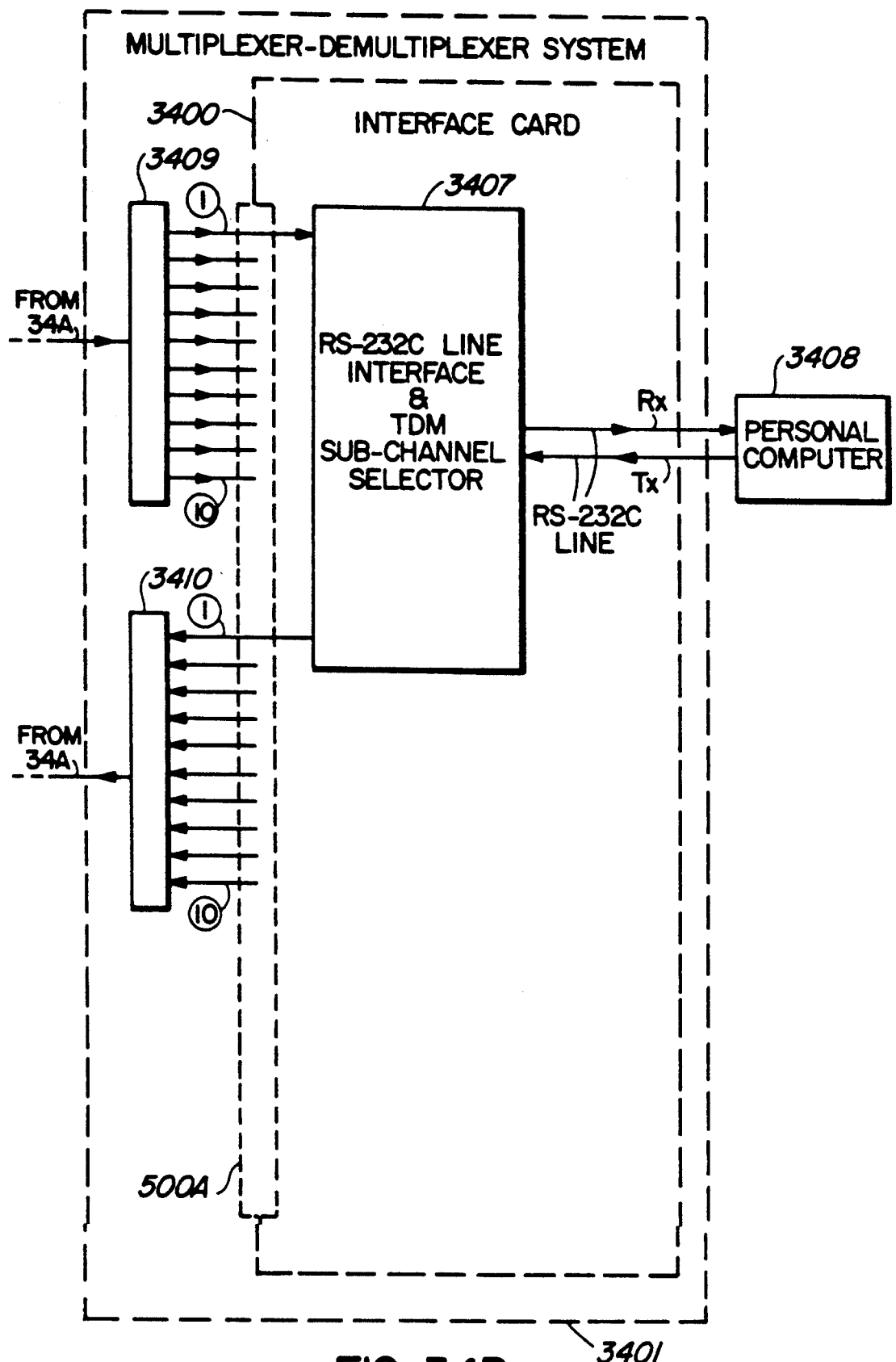

FIGS. 34A and 34B are enlarged sections of FIG. 34.

DETAILED DESCRIPTION OF THE INVENTION

With reference to FIGS. 1, 2, 3 and 5, an example of an embodiment of the invention to be described herein, is a digital multiplexer-demultiplexer system offering 10 SDM (Spatial Division Multiplex) data channels, with each channel providing 8 TDM (Time Division Multiplex) sub-channels. The number of SDM data channels and TDM sub-channels 10 and 8 respectively, are chosen here for illustrative purposes only, and do not mean to restrict the scope of the invention.

The 10 SDM data channels can be selected through suitable wiring, contacts or switches. The 8 TDM sub-channels are addressable time-slots established by a TDM scheme. The 8 TDM sub-channel time-slots can also be selected through electronic logic addressing by using suitable wiring, contacts or switches.

For simplicity, each of the SDM data channels is assumed to accept a data signal with a bit rate of 10 Mb/s, synchronously. Therefore, each of the 8 TDM sub-channels accepts data signals with a bit rate of (10 Mb/s)/8 = 1.25 Mb/s, synchronously. The aggregate data signal bit rate of the multiplexer-demultiplexer system is therefore,

[(10 Mb/s)/(SDM Data Channel)] × 10 SDM Data
Channel = 100 Mb/s .

An SDM data channel can be shared by up to 8 data signal sources because 8 TDM sub-channels are available on an SDM data channel. Also, a single data signal source can select a number of TDM sub-channels according to the required signal bit rate of the data signal source, and these TDM sub-channels may be located on the same SDM data channel, or spread among many SDM data channels.

By selecting one or more TDM sub-channels by means of electronic logic addressing, many data signal sources with a wide range of different bit rates can be multiplexed on to a single transmission line as part of the 100 Mb/s bit stream.

This results in a total of (10 SDM Data Channels) × (8 TDM Sub-Channels)/
(SDM Data Channel) = 80 TDM Sub-Channels that can be selected by electronic logic addressing through suitable wiring, contacts or switches. As a result, the multiplexer-demultiplexer system can accept a wide range of data bit rates from many data signal sources and transmit them through a single transmission line to be reproduced by the demultiplexer.

A number of high speed TDM digital multiplexer integrated circuits are on the market today. The AMD (Advanced Micro Devices Inc.) TAXIChip (Transparent Asynchronous Xmitter-receiver Interface Chip) Model AM7968 is one such example.

The AM7968 has 10 input data channels and each channel can accept a data bit rate ranging from 3.2 Mb/s to 10 Mb/s. The maximum aggregate data bit rate is 100 Mb/s. The housekeeping and information for demultiplexing adds 25 Mb/s, giving a maximum operational bit rate of 125 Mb/s.

A corresponding demultiplexer integrated circuit, Model AM7969, reproduces the 10 data signals presented to the multiplexer, on 10 output data channels. The pair of integrated circuits, AM7968 and AM7969, can be used to construct a 10 channel synchronous multiplexer-demultiplexer system by operating the AM7968 with a fixed clock rate.

Synchronous multiplexing here means that the data signal input to a multiplexer data channel must be presented at the same clock rate (e.g. 10 MHz) at which the data is being multiplex sampled. In addition, the data signal must be in phase with the multiplex sampling signal.

The present invention uses a synchronous multiplexer-demultiplexer system that provides parallel input and output data channels. The data signals at the input data channels of the multiplexer are multiplex sampled synchronously and transmitted to the demultiplexer where they are demultiplexed into the corresponding output data channels. Such a system can be found in integrated circuits such as the AM7968 and AM7969 pair.

For the purpose of illustration, a system with 10 data channels and an NRZ (Non-Return to Zero) data bit rate of 10 Mb/s for each channel is chosen.

SPACE DIVISION MULTIPLEX CIRCUITS

The 10 data channels can be viewed as 10 channels that are present in physical space and available to external data sources. In other words, they are in fact SDM (Space Division Multiplex) channels each operating at a 10 Mb/s bit rate.

Figure 1:
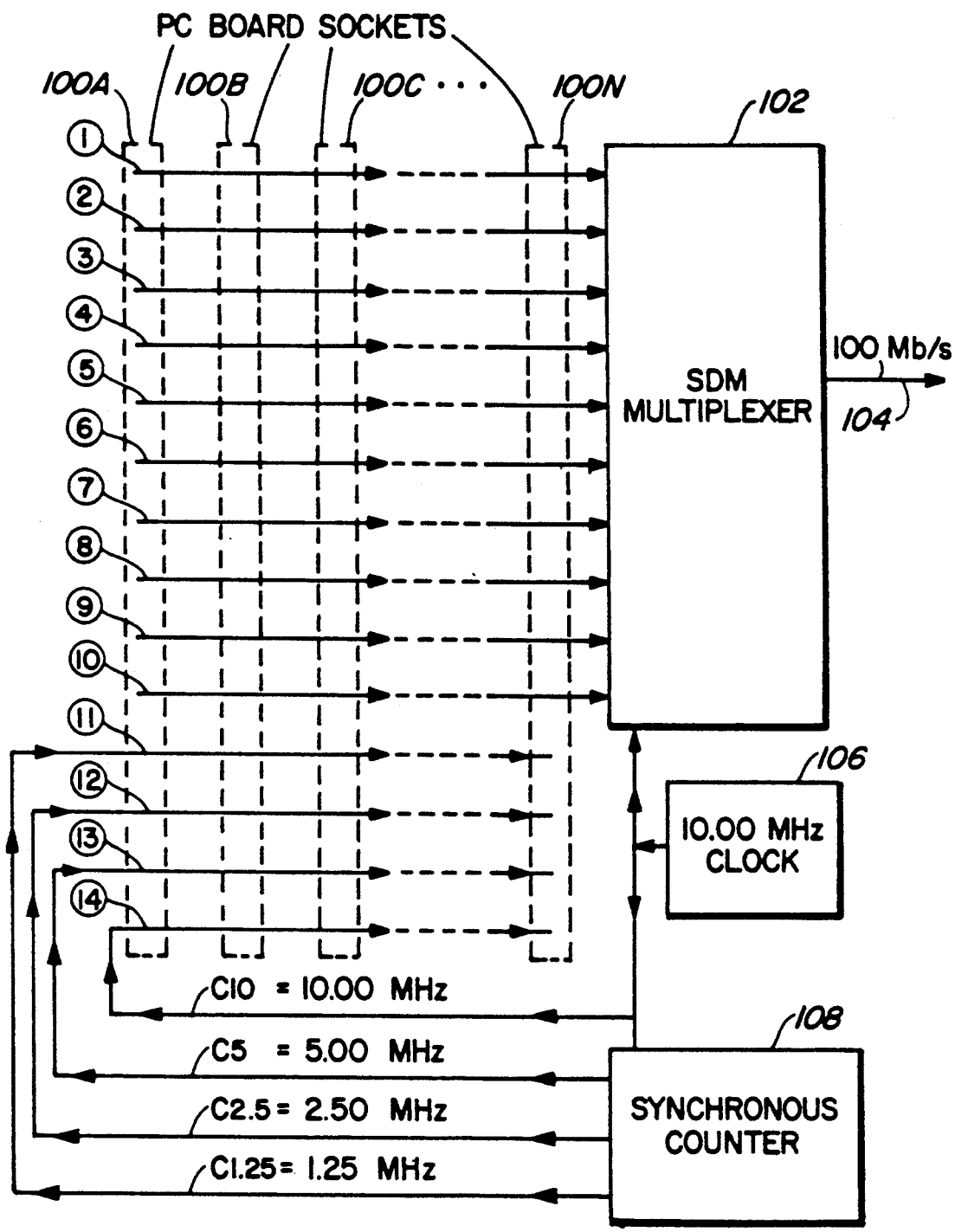
FIG. 1 is a block schematic illustrating the SDM data channels at the multiplexer in accordance with an embodiment of the invention.

As shown in FIG. 1, each of the 10 SDM data channels, referenced with circled numbers 1 to 10, are connected in common to PC (Printed Circuit) board sockets 100A to 100N and in turn to an SDM multiplexer 102. The SDM multiplexer 102 has an output channel 104 for carrying the multiplexed data signal.

A 10 MHz clock 106 is connected to the SDM multiplexer 102 to serve as the reference clock which synchronously operates each of the 10 SDM data channels at 10 Mb/s.

When interface cards in the form of printed circuit boards that connect external data sources to the multiplexer system are plugged into sockets 100A to 100N, the PC board contacts, or jumper wires connected to the PC board contacts, or switches connected to the PC board contacts, physically connect to one or more specific SDM data channels.

Depending on particular applications, an SDM data channel may be shared by a number of interface cards because each SDM data channel has a number of TDM (Time Division Multiplex) sub-channels available.

TIME DIVISION MULTIPLEX CIRCUITS

As shown in FIG. 1, the 10 MHz clock 106 is also connected to a synchronous counter 108 which synchronously divides the 10 MHz clock signal and generates the series of clock signals:

C5 = 5.00 MHz
C2.5 = 2.50 MHz
C1.25 = 1.25 MHz

These clock signals are digital bit streams of RZ (Return to Zero) signals at the specified frequencies. They, together with the 10 MHz clock signal, are supplied to the sockets 100A to 100N through the circuit lines referenced with circled numbers 11 to 14.

The TDM sub-channels are established on each SDM data channel by using the series of clock signals generated by the synchronous counter 108. For the purpose of illustration, an example of 8 TDM sub-channels (i.e. time-slots) is chosen. This means that a TDM sub-channels operates at a bit rate of (10 Mb/s)/8 = 1.25 Mb/s.

Since there are 10 SDM data channels each with 8 TDM sub-channels (i.e. time-slots), the multiplexer-demultiplexer system has 80 TDM sub-channels available.

As mentioned above, a TDM sub-channel operates at 1.25 Mb/s and a multiple of this bit rate can be transmitted by choosing a suitable combination of TDM sub-channels. The highest combined bit rate is set by the aggregate SDM data channel capacity which is 100 Mb/s.

Housekeeping signals such as those for synchronizing the SDM multiplexer 102 and SDM demultiplexer are added to this 100 Mb/s bit stream and the final bit rate is 125 Mb/s. However, in the following sections, for simplicity, the aggregate bit rate is considered to be 100 Mb/s.

Figure 2:
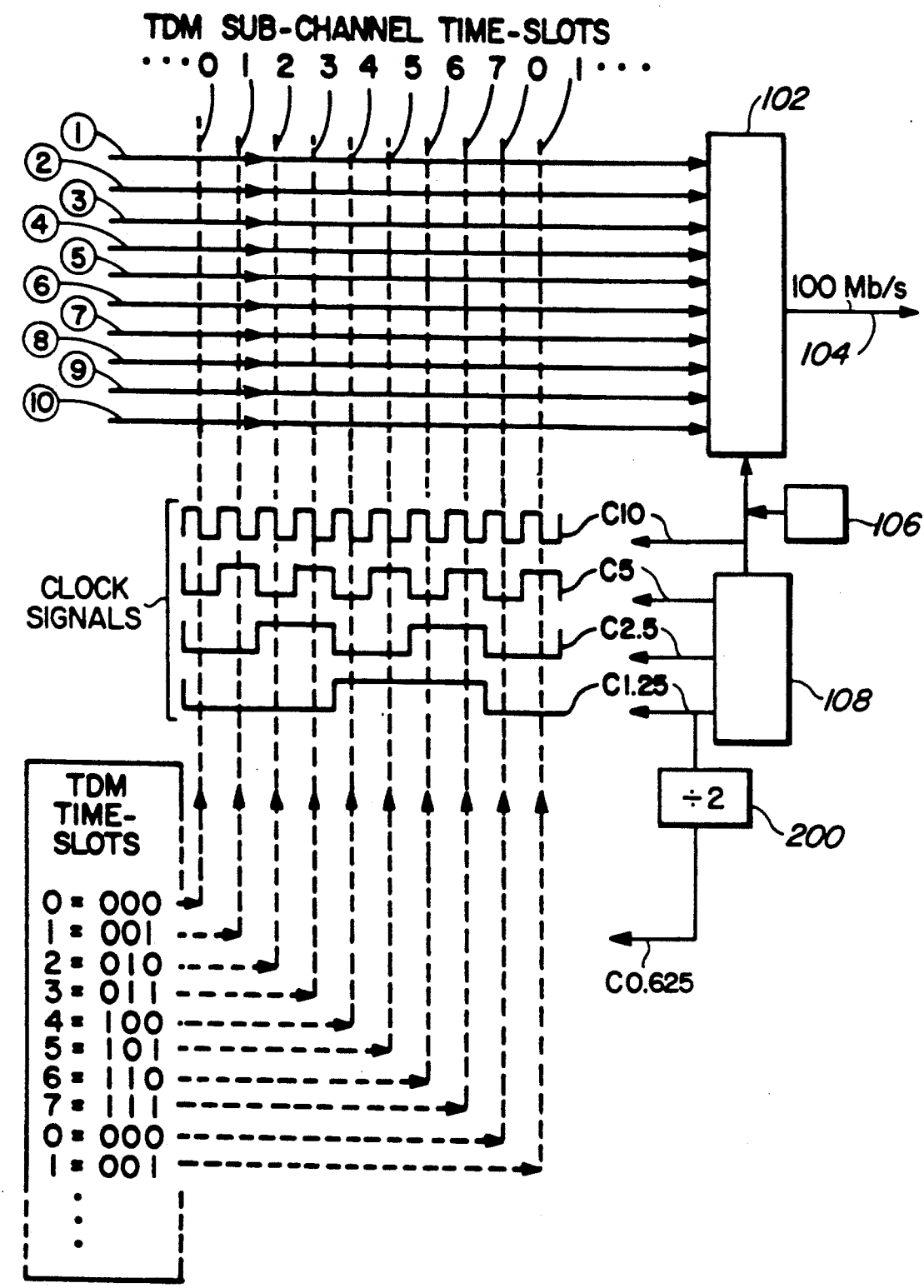
FIG. 2 is a block schematic illustrating the sub-multiplexing TDM sub-channels at the multiplexer in accordance with an embodiment of the invention.

The time-slot arrangement for TDM sub-channels (i.e. time-slots) is shown in FIG. 2. The 8 TDM sub-channel time-slots can be identified by a 3-bit binary code. To realize the TDM scheme where the 3-bit binary code addresses appear in an orderly sequence in terms of time, the lowest, middle and highest order digit in the address code are set by the logic levels of the clock signals $C_5$, $C_{2.5}$ and $C_{1.25}$, respectively. In addition, the lowest clock rate $C_{1.25}$ is divided in half by divider 200 to provide a clock $C_{0.625}$ at 0.625 MHz, the application of which will be described later. The sequence of addresses is repeated continuously to establish the TDM scheme.

Selection of a single TDM sub-channel time-slot out of the 8 that are available, is achieved by supplying a 3-bit binary code that specifies a TDM sub-channel time slot, to a 3-bit binary comparator which compares the code to the logic levels of the clock signals $C_5$, $C_{2.5}$ and $C_{1.25}$. When a match is found, an enable pulse is produced synchronously With the clock signal C10 and supplied to a latching circuit which multiplex samples the data signal.

In summary, the multiplexer system has ten 10 Mb/s SDM data channels that are multiplexed into a 100 Mb/s data bit stream. The 8 TDM sub-channel time-slots of each SDM data channel are identified by a 3-bit binary code which provides 8 TDM sub-channel time-slot addresses. This means that a 10 Mb/s SDM data channel is sub-multiplexed into eight 1.25 Mb/s TDM sub-channels.

The TDM sub-channel time-slots are repeated continuously. One or more specific TDM sub-channel time-slots can be used by an interface card to sub-multiplex a data signal on to a particular SDM data channel. As mentioned above, a 3-bit binary code comparator and latching circuit are used to sub-multiplex a data signal into one or more specific TDM sub-channel time-slots.

Figure 3:
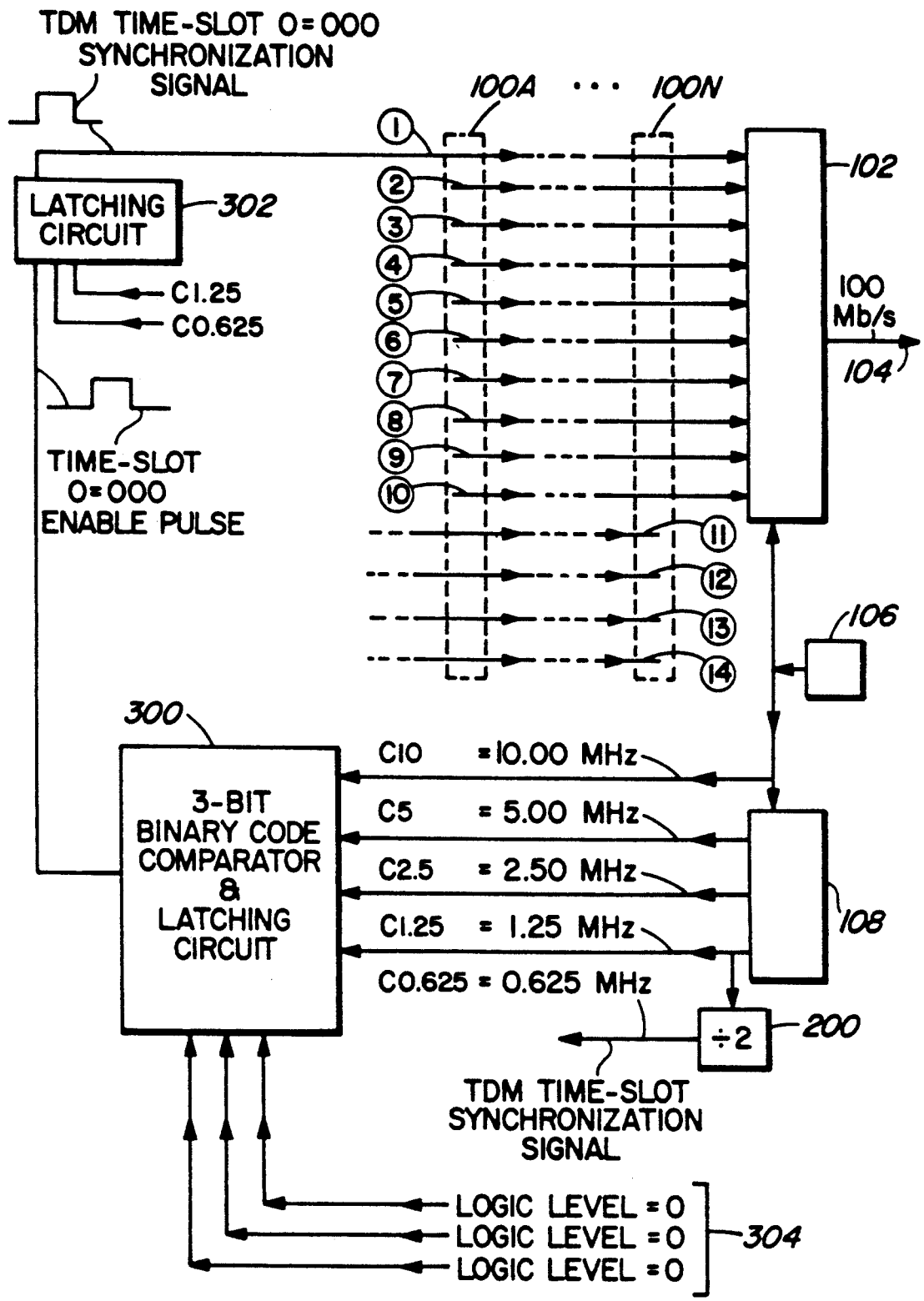
FIG. 3 is a block schematic illustrating the embodiment of FIG. 2, with additional elements showing the manner in which a synchronization signal is generated to allow identification of the TDM sub-channels at the demultiplexer system.
Figure 4:
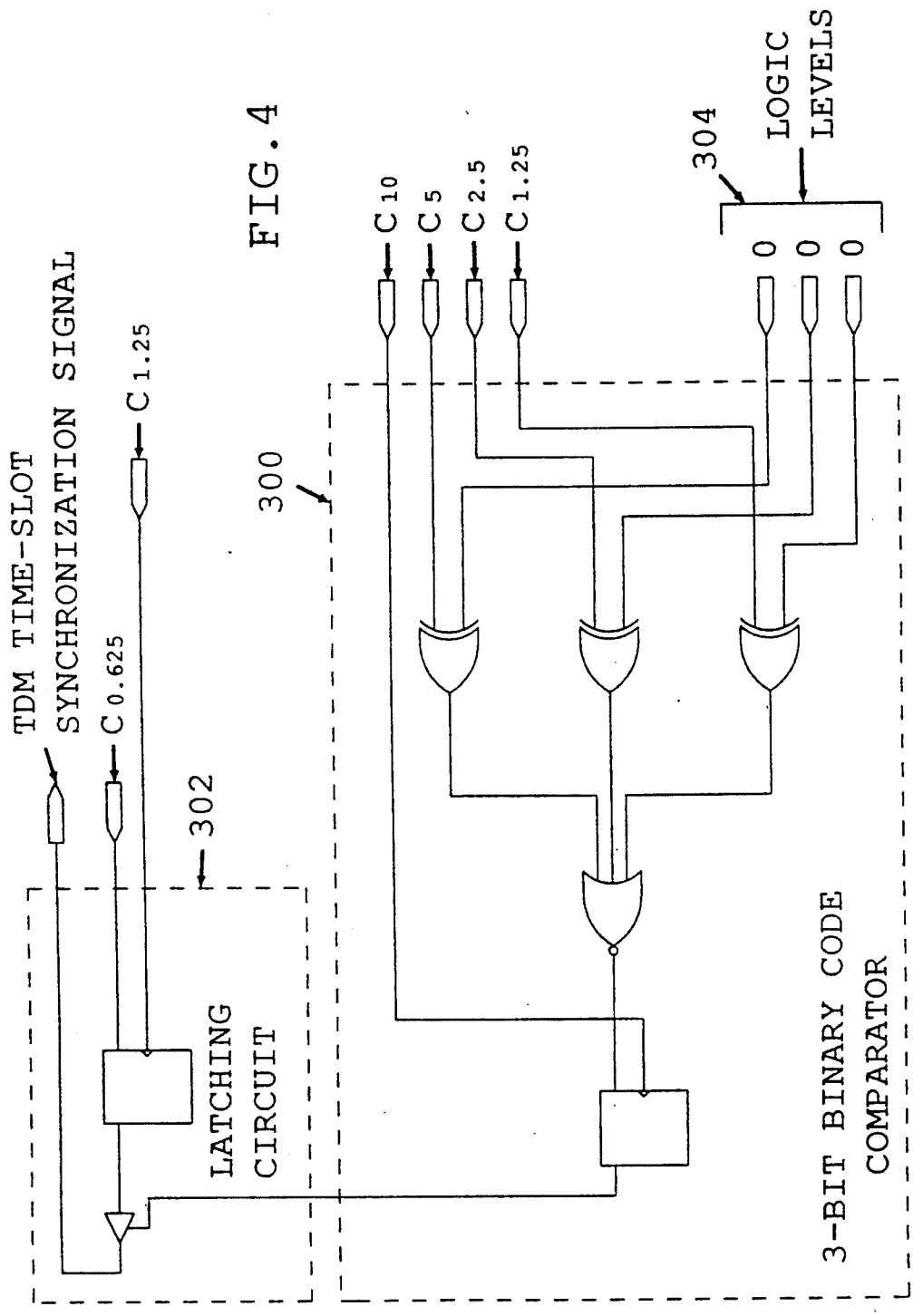
FIG. 4 is a circuit diagram that can be used to form part of the embodiment of FIG. 3.

In order to positively identify at the demultiplexer, the addresses of the TDM sub-channel time-slots on each of the SDM data channels and bring about one-to-one correspondence between the TDM sub-channel time-slots of the multiplexer and demultiplexer, a synchronization signal must be provided by the multiplexer. FIG. 3 shows a block schematic illustrating the generation of this synchronization signal and FIG. 4 is a circuit diagram showing key elements of FIG. 3.

The TDM sub-channel time-slot identifier synchronization signal is an alternating pattern of 0 and 1 logic levels. It is placed in the TDM sub-channel time-slot 000=0. This address is identified by the 3-bit binary code comparator 300 using the 3-bit binary code input 304 which is set at logic levels 0,0 and 0.

The comparator 300 compares the 000 address with the $C_5$, $C_{2.5}$ and $C_{1.25}$ clock signals. When the logic levels of the three clock signals match the logic levels of the address 000, an enable pulse is generated in synchronization with the C10 clock signal and provided to the latching circuit 302.

At the latching circuit 302, the two inputs $C_{1.25}$ and $C_{0.625}$, and the enable pulse from the comparator 300 combine to produce a 1.25 Mb/s NRZ (None Return to Zero) TDM sub-channel time-slot synchronization signal that is alternating between logic levels 0 and 1 because, in effect the $C_{0.625}$ clock signal is being sampled by the $C_{1.25}$ clock signal. This synchronization signal is placed on to the SDM data channel referenced with circled number 1 by a wire connection.

The alternating pattern of the synchronization signal serves as the 000=0 TDM sub-channel time-slot identifier at the demultiplexer system which searches for this pattern on the SDM data channel referenced with circled number 1. All other TDM sub-channels time-slots are referenced to this 000=0 address.

SPACE DIVISION DEMULTIPLEX CIRCUITS

Figure 5:
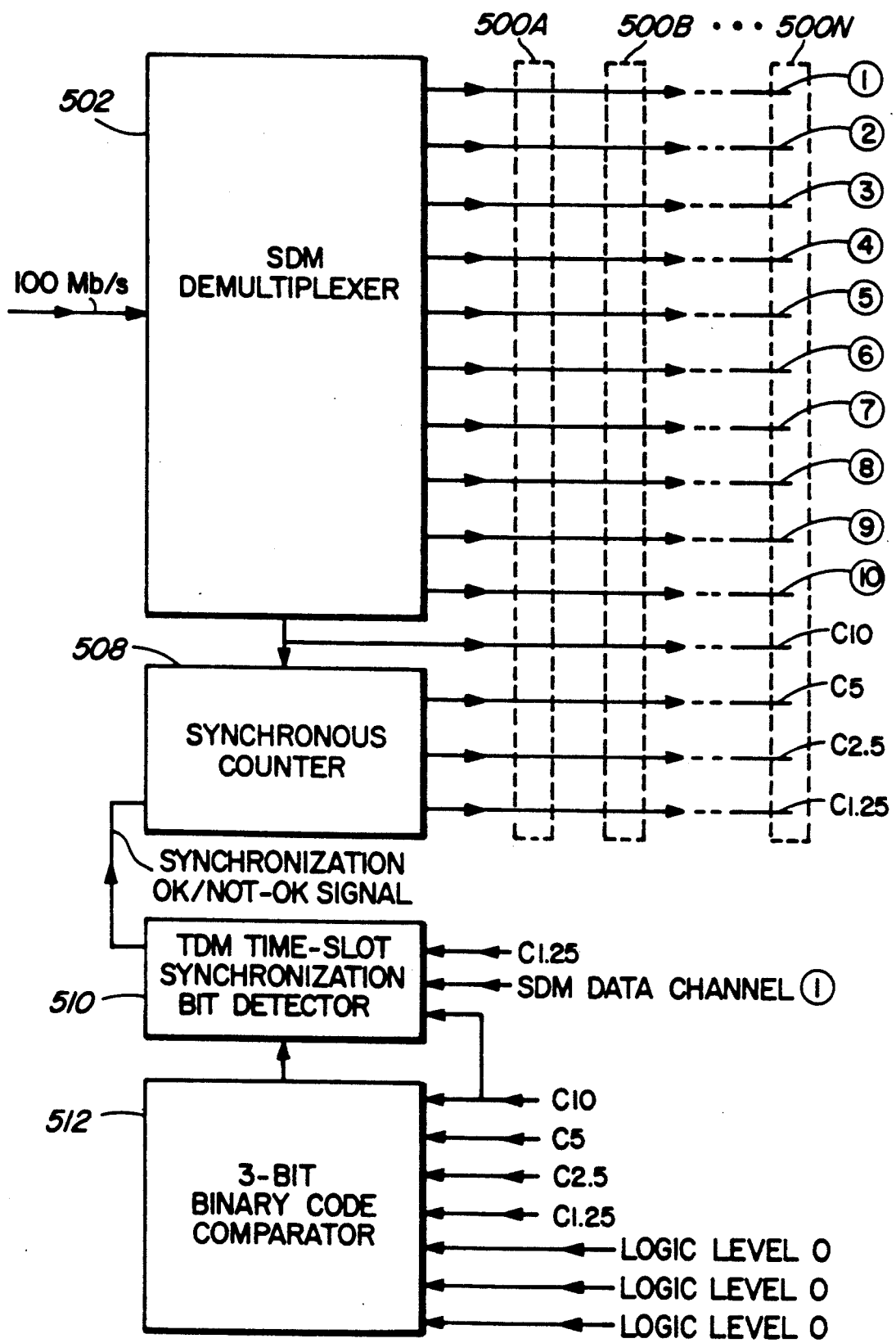
FIG. 5 is a block diagram illustrating the SDM data channels and synchronization scheme at the demultiplexer in accordance with an embodiment of the invention.
Figure 7:
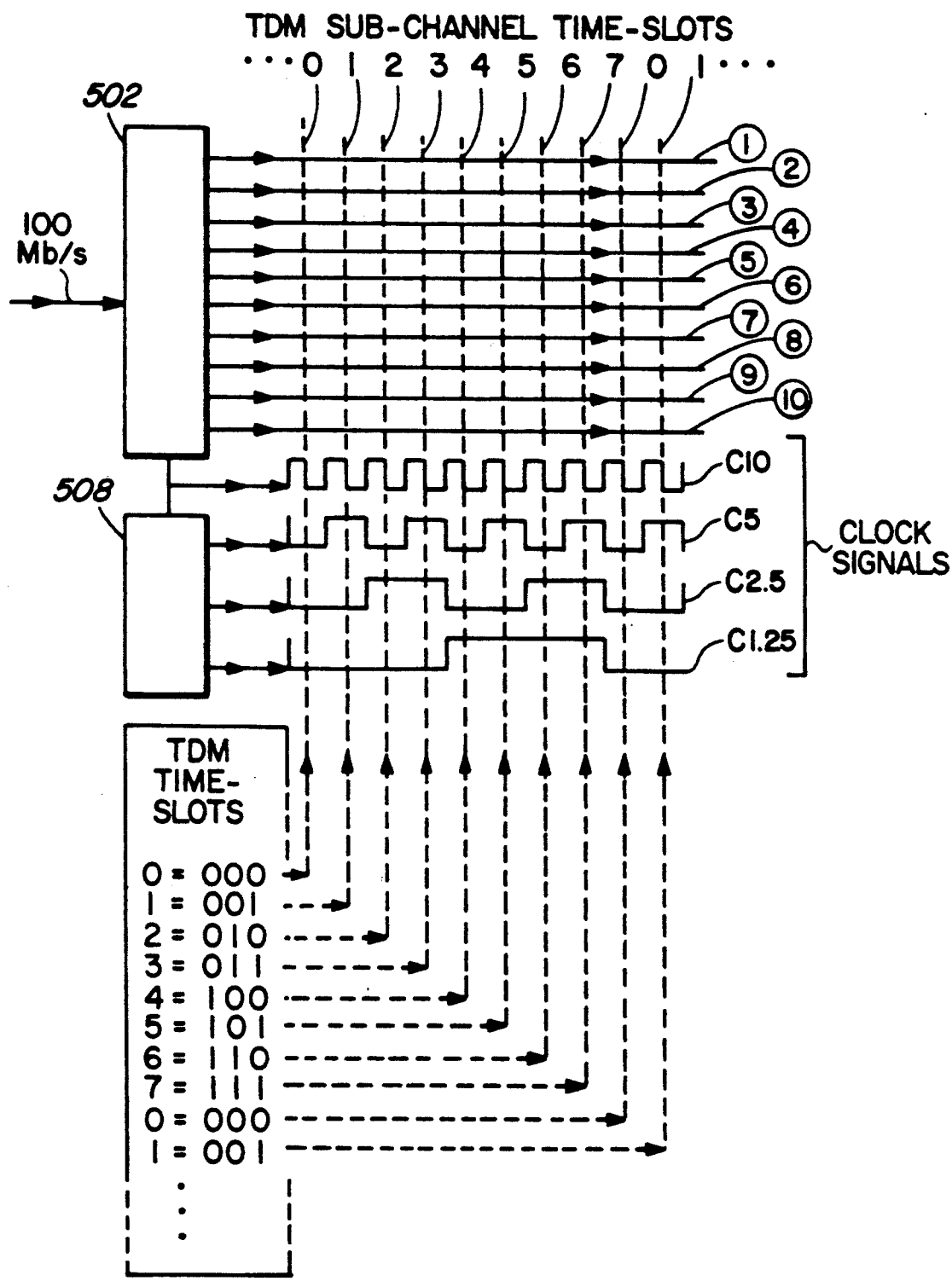
FIG. 7 is a block diagram illustrating the TDM sub-channels at the demultiplexer in accordance with an embodiment of the invention.

FIGS. 5 and 7 show block diagrams of the SDM demultiplexer. FIG. 7 is a reproduction of FIG. 5 but modified to illustrate the various clock signals and TDM sub-channel time-slots. The 100 Mb/s multiplexed data signal is connected to the input of the SDM demultiplexer 502 which is the counterpart of the SDM multiplexer 102. The SDM demultiplexer 502 has 10 SDM data channels reference with circled numbers 1 to 10 as outputs, each with a 10 Mb/s bit rate. The SDM data channels at the demultiplexer system are in one-to-one correspondence with those at the multiplexer system.

Each of the SDM data channels are connected in common to PC (Printed Circuit) board sockets 500A to 500N. Interface cards in the form of PC boards that are the counterparts to interface cards plugged in at the multiplexer, are plugged into sockets 500A to 500N. External data receivers are connected to the demultiplexer through these interface cards.

When interface cards are plugged into any of the sockets 500A to 500N, the PC board contacts, or jumper wires connected to the PC board contacts, or switches connected to the PC board contacts, are physically connected to one or more SDM data channels that correspond to those that are used by the counterpart interface card at the multiplexer.

Depending on particular applications, an SDM data channel may be shared by a number of interface cards because each SDM data channel has 8 TDM (Time Division Multiplex) sub-channels available.

The interface cards are supplied with a $C_{10}=10$ MHz clock signal which is recovered by a clock recovery circuit in the SDM demultiplexer 502. The 10 MHz clock signal is also supplied to a synchronous counter 508 which produces the synchronous clock signals:

$C_5 = 5.00$ MHz
$C_{2.5} = 2.50$ MHz
$C_{1.25} = 1.25$ MHz that are supplied to the interface cards through the sockets 500A to 500N. These clock signals are used by the interface cards according to their specific applications.

TIME-DIVISION DEMULTIPLEX CIRCUIT

In order to synchronize the TDM sub-channel time-slots with those at the multiplexer, the synchronous counter 508 is controlled by a signal from a TDM sub-channel time-slot synchronization bit detector 510.

FIG. 6A shows the circuits for the synchronization bit detector 510 which detects whether the TDM sub-channel time-slots have achieved one-to-one correspondence with those at the multiplexer. A 3-bit binary code comparator 512 is also used in this detection process. Detection is accomplished by searching through the 8 TDM sub-channel time-slots on the SDM data channel referenced with circled number 1, for the TDM sub-channel time-slot that is alternately repeating 0 and 1 logic levels. Such a TDM sub-channel time-slot is the sub-channel time-slot with the 000=0 address which was established at the multiplexer system.

To detect this pattern of repeated 0 and 1 logic levels, the bit in one of the TDM sub-channels time-slots in the SDM data channel referenced with circled number 1 is sampled and held for comparison with the 8th TDM sub-channel time-slot that follows.

This comparison is accomplished when the 3-bit binary code comparator 512 which compares the 000 address with the clock signals $C_{1.25}$, $C_{2.5}$ and $C_5$ and detects agreement of the logic levels. Then, in synchronization with the C10 clock signal, a logic pulse signal is sent to the TDM sub-channel time-slot synchronization bit detector circuit 510.

At this point, whether synchronization has been achieved between the multiplexer and demultiplexer system's TDM sub-channel time-slots, is not apparent. There may be a difference between the TDM sub-channel time-slot 000 at the multiplexer and the TDM sub-channel time-slot 000 at the demultiplexer. Therefore, the sub-channel time-slot chosen above may not be the correct time slot that is being sought.

Figure 6B:
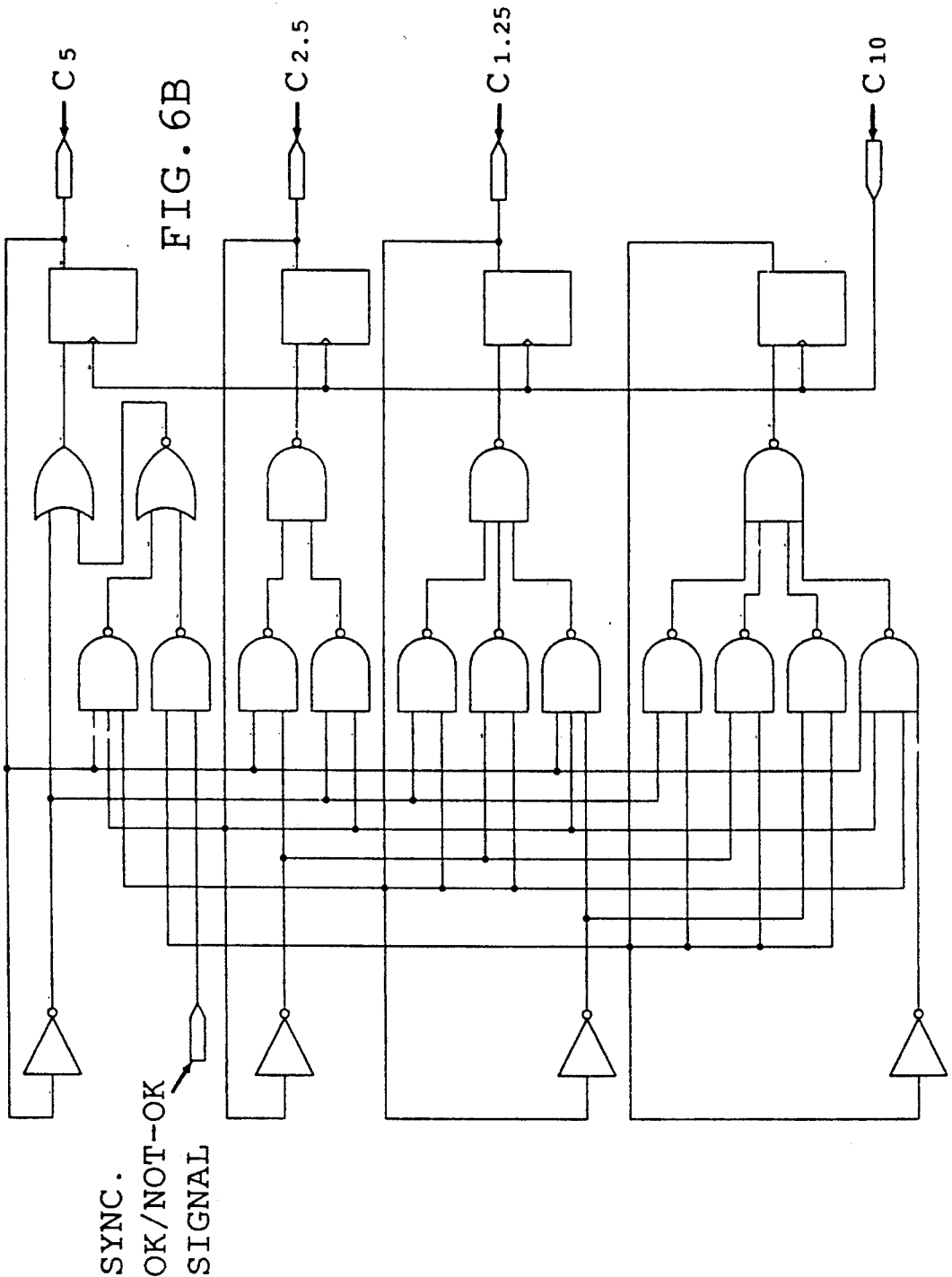

The TDM sub-channel time-slot synchronization bit detector stores 2 consecutive logic levels of what is considered to be the TDM sub-channel time-slot 000 on SDM data channel referenced with circled number 1, into a shift-register formed by two D-type flip-flop circuits 514. If the stored logic levels are 0 and 0, or 1 and 1, a logic level 1 is sent to the synchronous counter 508, the circuit of which is shown in FIG. 6B. This logic level 1 is the synchronization Not-OK signal. An exclusive NOR gate 516 is used for the purpose of transmitting the synchronization Not-OK signal.

If, on the other hand, the stored logic levels are 0 and 1, or 1 and 0, a logic level 0 is sent to the synchronous counter 508 as a synchronization OK signal, through the exclusive NOR gate 516.

At the synchronous counter 508, if the logic level from the synchronization detector 510 is 1 meaning that synchronization is Not-OK, the counter 508 counts from 0 to 14 and resets. Since the count is 1 less than 16, the clock signals $C_{1.25}$, $C_{2.5}$ and $C_5$ are shifted 1 bit in terms of, and with respect to, the 10 MHz clock signal. Therefore, the 000 TDM sub-channel time-slot that is detected by the 3-bit binary comparator 512 is also shifted by 1 TDM sub-channel time-slot for the count cycle which is normally 16 bits (i.e. 2×8 TDM sub-channel time-slots=16 TDM sub-channel time-slots).

It should be noted that the count cycle of the synchronous counter is set at 16 instead of 8 because two consecutive bits in the 000 address must be compared. Table 3 on the following page illustrates the progress towards achieving synchronization through this process of shifting the TDM sub-channel time-slot address by 1 bit at a time with respect to the 10 MHz clock signal.

The 1 bit shift, as shown in Table 3, is continued until the logic level from the synchronization detector 510 is 0, indicating that synchronization is OK. When this signal is received by the synchronous counter 508, the counter counts 16 bits from 0 to 15 and resets.

TABLE 3

| MULTIPLEXER TDM SUB-CHANNELS TIME-SLOT ADDRESS | DEMULTIPLEXER TDM SUB-CHANNELS TIME-SLOT ADDRESS 2 STEPS BEFORE SYNCHRONIZATION | DEMULTIPLEXER TDM SUB-CHANNELS TIME-SLOT ADDRESS 1 STEP BEFORE SYNCHRONIZATION | DEMULTIPLEXER TDM SUB-CHANNELS TIME-SLOT ADDRESS SYNCHRONIZATION ACHIEVED |
|---|---|---|---|
| — | — | — | — |
| — | — | — | — |
| 011 | 101 | 100 | 011 |
| 100 | 110 | 101 | 100 |
| 101 | 111 | 110 | 101 |
| 110 | | 111 | 110 |
| 111 | →000← | | 111 |
| | 001 | →000← | |
| →000← | 010 | 001 | →000← |
| 001 | 011 | 010 | 001 |
| 010 | 100 | 011 | 010 |
| 011 | 101 | 100 | 011 |
| 100 | 110 | 101 | 100 |
| 101 | 111 | 110 | 101 |
| 110 | | 111 | 110 |
| 111 | →000← | | 111 |
| | 001 | →000← | |
| →000← | 010 | 001 | →000← |
| 001 | 011 | 010 | 001 |
| 010 | 100 | 011 | 010 |
| 011 | 101 | 100 | 011 |
| 100 | 110 | 101 | 100 |
| 101 | 111 | 110 | 101 |
| 110 | | 111 | 110 |
| 111 | →000← | | 111 |
| | 001 | →000← | |
| →000← | 010 | 001 | →000← |
| 001 | 011 | 010 | 001 |
| 010 | 100 | 011 | 010 |
| — | — | — | — |

As a result, provided the logic level of the TDM sub-channel time-slot 000 continues to repeat the . . . , 0, 1, 0, 1, ... pattern, the 000 address detected by the 3-bit binary code comparator becomes the same as that established by the multiplexer. The clock signals and TDM sub-channel time-slots at the demultiplexer achieve synchronization and one-to-one correspondence respectively, with those at the multiplexer in this manner, by using the TDM sub-channel time-slot 000 on SDM data channel referenced with circled number 1, as the reference point.

Once the synchronization is achieved, the synchronous counter 508 is set to produce and continuously repeat the pattern of clock signals that are shown in FIGS. 2 and 7.

In summary, the multiplexer system establishes 8 TDM sub-channel time-slots with addresses 000 to 111 inclusively. To achieve one-to-one correspondence between the TDM sub-channel time-slots of the multiplexer and demultiplexer, the TDM sub-channel time-slot 000 on the SDM data channel referenced with circled number 1 is provided with a synchronization signal that is continuously alternating between 0 and 1 logic levels. At the demultiplexer system, the repeated 0, 1 pattern is detected by the synchronization bit detector 510 and synchronization achieved. Until this happens, the search for the 0, 1 pattern is carried out by shifting the search address one by one, as shown in Table 3.

The 100 Mb/s multiplexed data stream is demultiplexed into 10 SDM data channels, each with a 10 Mb/s bit rate. The TDM sub-channel time-slots of a 10 Mb/s SDM data channel are identified by a 3-bit binary code which provides 8 TDM sub-channel time-slot addresses. These addresses are repeated cyclically. The data in a particular TDM sub-channel time-slot is extracted (i.e. demultiplexed) by a latching circuit where the enable signal is provided when the particular binary code of the address of a TDM sub-channel time-slot is detected by a 3-bit binary code comparator.

APPLICATION INTERFACE CARDS

The multiplexer-demultiplexer system described here offers 10 SDM data channels and 8 TDM sub-channels for each SDM data channel. Therefore, a total of 80 TDM sub-channels are available. Each of the TDM sub-channels accepts data signals synchronously at a bit rate of 1.25 Mb/s and/or each of the SDM data channels can accept data signals synchronously at a bit rate of 10 Mb/s.

Interface cards can be designed to select a number of TDM sub-channels and/or SDM data channels as the application demands. The SDM data channels can be selected by connections to the contacts of the interface card PC board which plugs into one of the sockets 100A to 100N, or 500A to 500N. Of course, if the application requires a 10 Mb/s data channel such as the case of an Ethernet LAN (Local Area Network), one of the SDM data channels can be dedicated to its use.

It should be noted that a single SDM data channel can be shared by a number of data signal sources because each SDM data channel has 8 TDM sub-channels which might be used by different data signal sources. Also, a data signal source can use a number of TDM sub-channels depending on the bit rate of the data signal source. The TDM sub-channels may be chosen from one SDM data channel, or spread among a number of SDM data channels.

SUB-MULTIPLEXING OF A 1.25 Mb/s DATA SIGNAL

Figure 8:
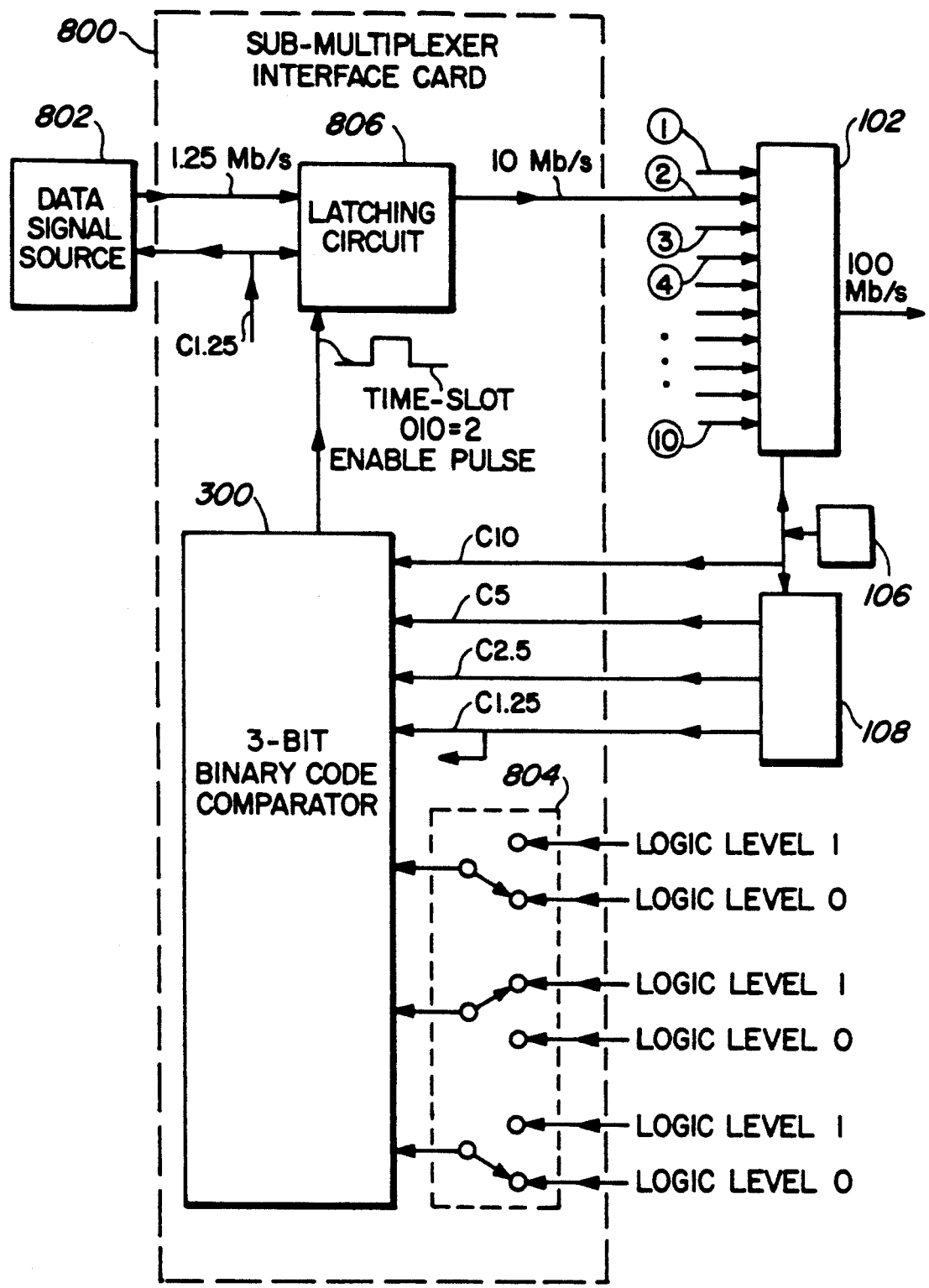
FIG. 8 is a block diagram illustrating an interface card for sub-multiplexing a 1.25 Mb/s data signal synchronously.
Figure 9:
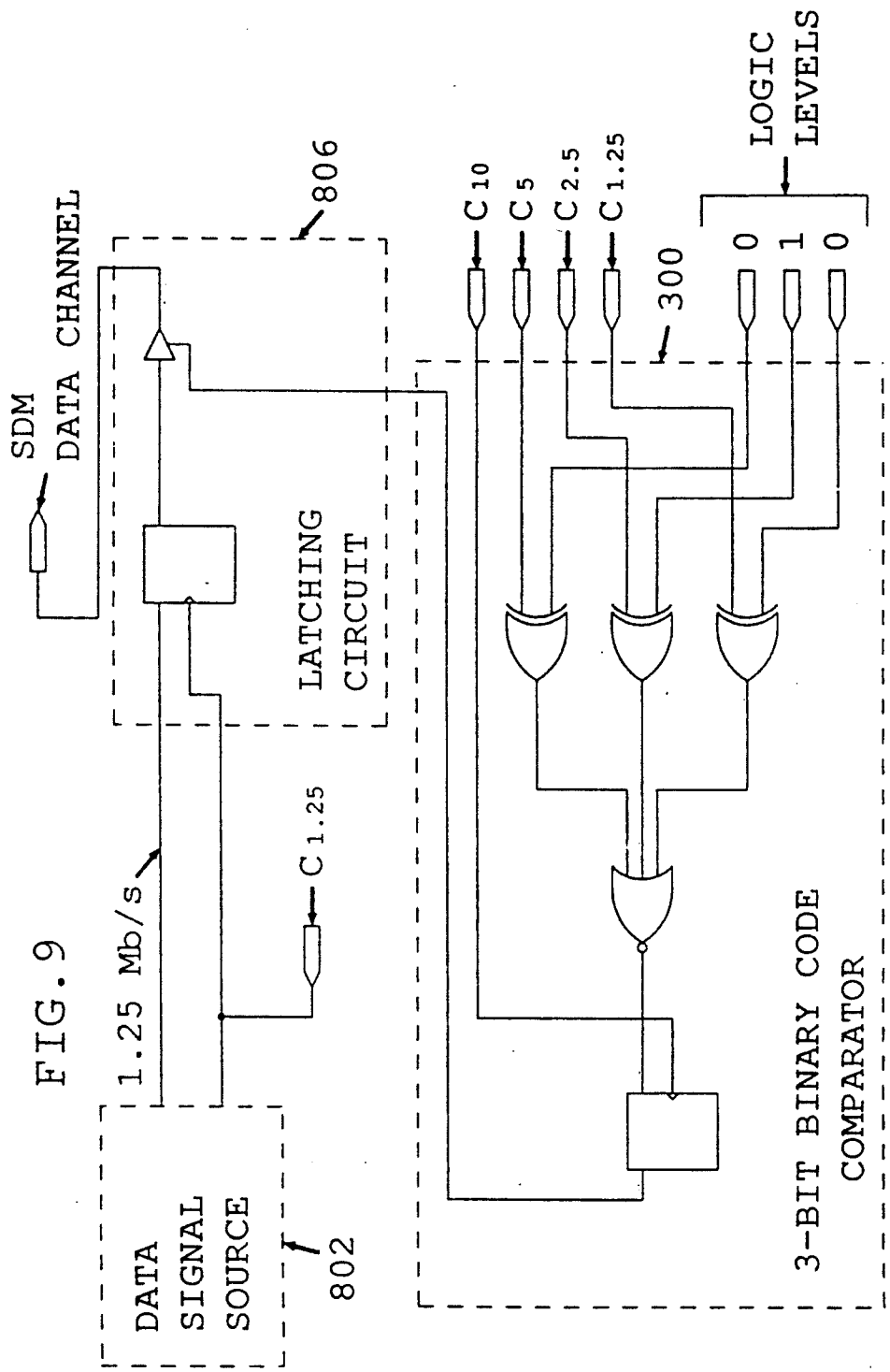
FIG. 9 is a circuit diagram of a multiplex sampling circuit that can be used to form part of the embodiment, of FIG. 8.

FIG. 8 is a block diagram of an interface card 800 that sub-multiplexes a 1.25 Mb/s data signal from an external data source 802 on to the SDM data channel referenced with circled number 2 and FIG. 9 shows the circuit diagram corresponding to key portions of the block diagram. The TDM sub-channel time-slot chosen for sub-multiplexing is 010=2, the third time-slot in the sequence of 8 recurring time-slots.

The logic levels 010=2 for the TDM sub-channel time-slot address can be provided through a set of mechanical switches 804 such as DIP (Dual In-line Package) switches or from an electronic source such as a microcontroller.

A 3-bit binary code comparator 300 receives the logic address 010=2 and compares it to the logic levels of the clock signals $C_5$, $C_{2.5}$ and $C_{1.25}$ from the synchronous counter 108.

When the bit pattern 010 is detected, an enable pulse is sent to a latching circuit 806 in synchronization with the clock signal $C_{10}$. Then the incoming 1.25 Mb/s data signal from the data signal source 802 is sampled for multiplexing and placed on to SDM data channel referenced with circled number 2.

Note that the multiplex sampled signal has a pulse width equal to that of the width of an NRZ 10 Mb/s signal. The same can be said of all multiplex sampled signals discussed in the following application examples.

Since the 1.25 Mb/s data signal must be in synchronization with the timing of the latching circuit, the $C_{1.25}$ clock signal is supplied to the data signal source 802 as a reference.

SUB-DEMULTIPLEXING OF A 1.25 Mb/s DATA SIGNAL

Figure 10:
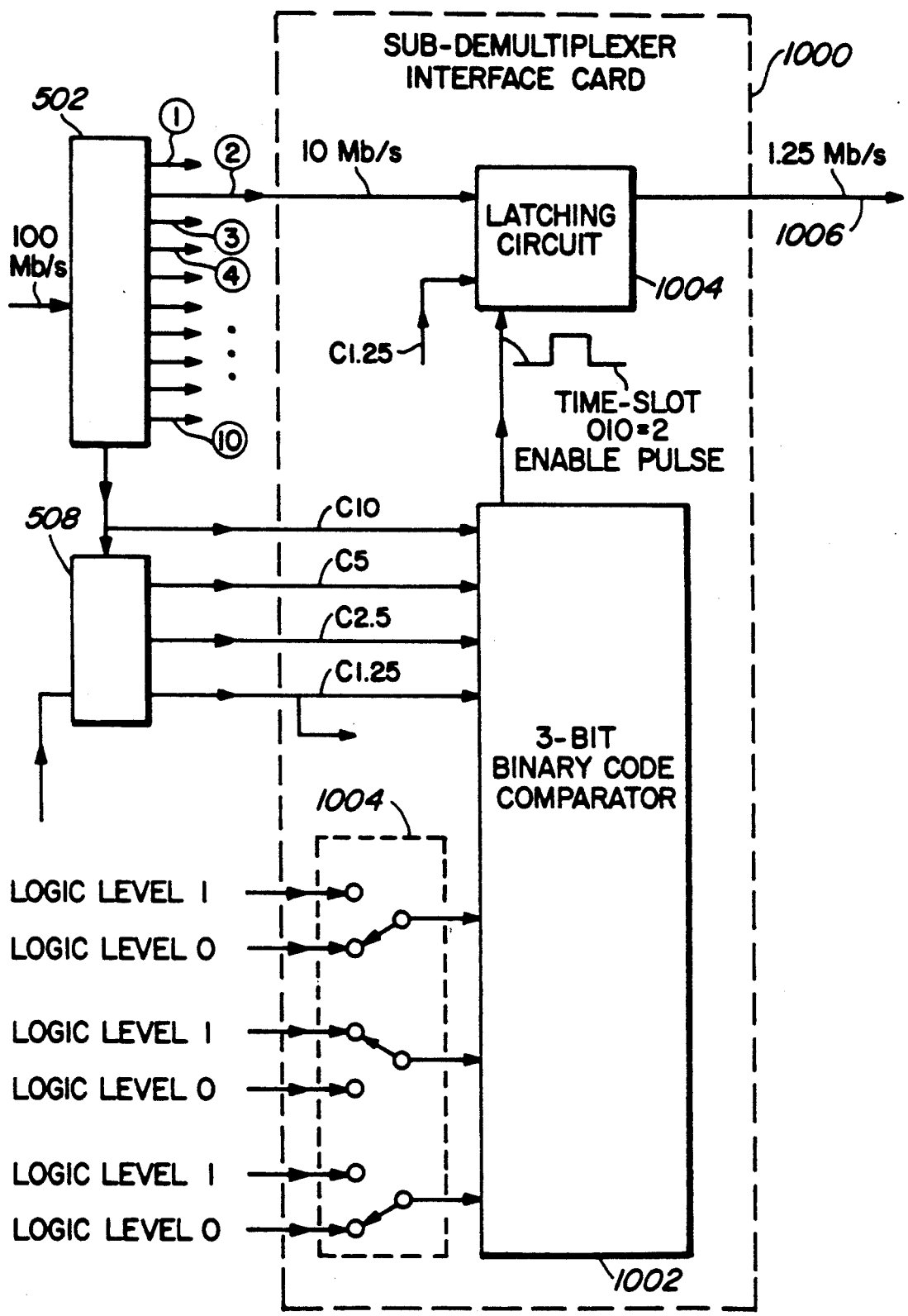
FIG. 10 is a block diagram illustrating an interface card for demultiplexing the 1.25 Mb/s data signal.
Figure 11:
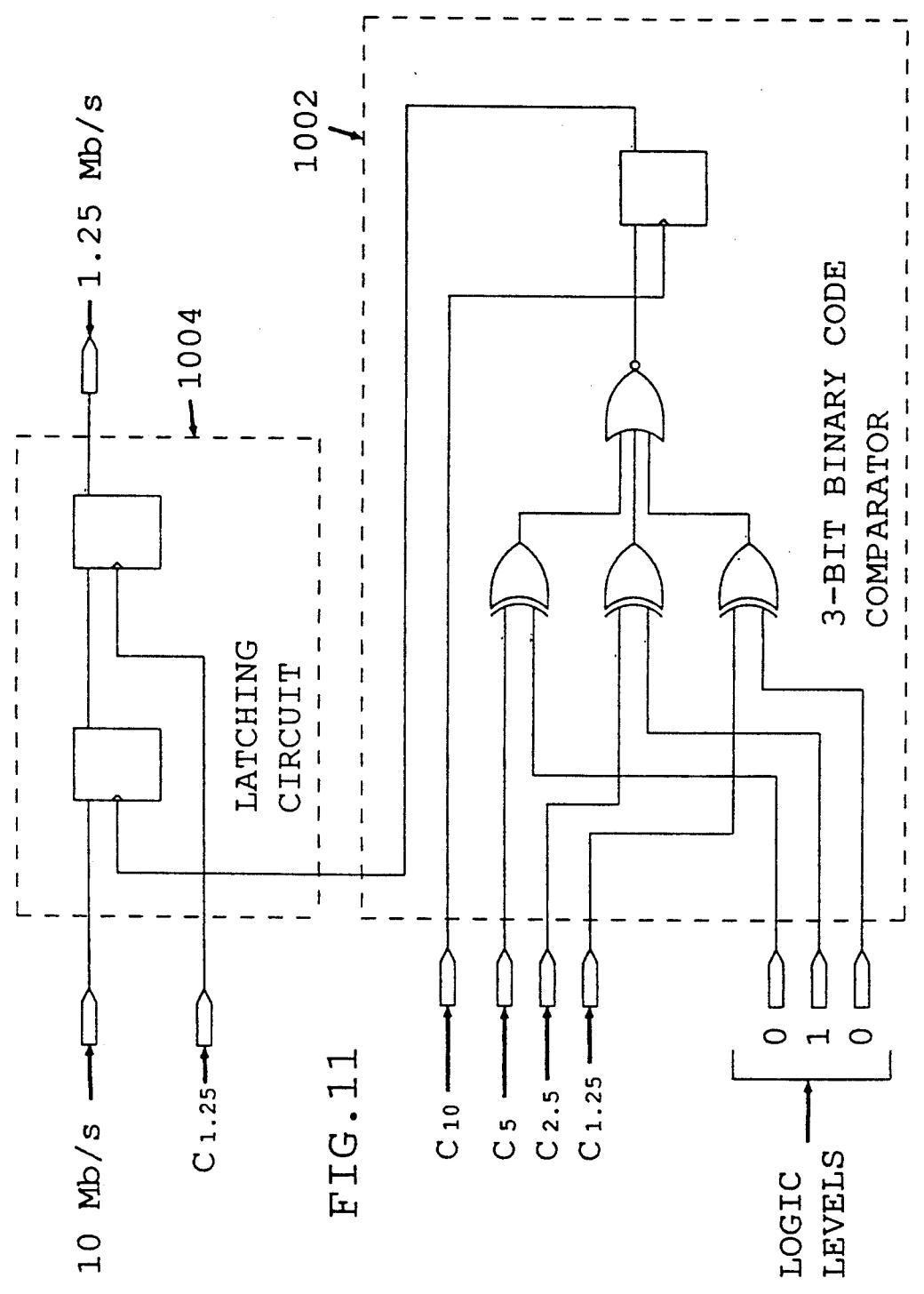

FIG. 10 shows a block diagram of an interface card 1000 that sub-demultiplexes the 1.25 Mb/s data signal and FIG. 11 shows the circuit diagram corresponding to key portions of the block diagram. This card is the counterpart to the interface card 800 described above. It recovers the 1.25 Mb/s data signal that was multiplexed on to the SDM data channel referenced with circled number 2 and TDM sub-channel time-slot 010=2 of the multiplexer.

As in the preceding case of sub-multiplexing, a 3-bit binary comparator 1002 compares the 3-bit TDM sub-channel time-slot address code 010 with the clock signals $C_5$, $C_{2.5}$ and $C_{1.25}$ derived as described with reference to FIGS. 5, 6A and 6B. This address code can, of course, be provided through a set of mechanical switches 1004 such as DIP (Dual In-line Package) switches or from an electronic source such as a microcontroller.

When the bit pattern 010 is detected, an enable pulse is sent to a latching circuit 1004 in synchronization with the clock signal $C_{10}$. The latching circuit extracts the sample bit belonging to the original 1.25 Mb/s data signal, reconstructs the original data signal bit and provides it to the output line 1006. Repeated operations reproduce the original signal.

SUB-MULTIPLEXING OF A 2.50 Mb/s DATA SIGNAL

Figure 12:
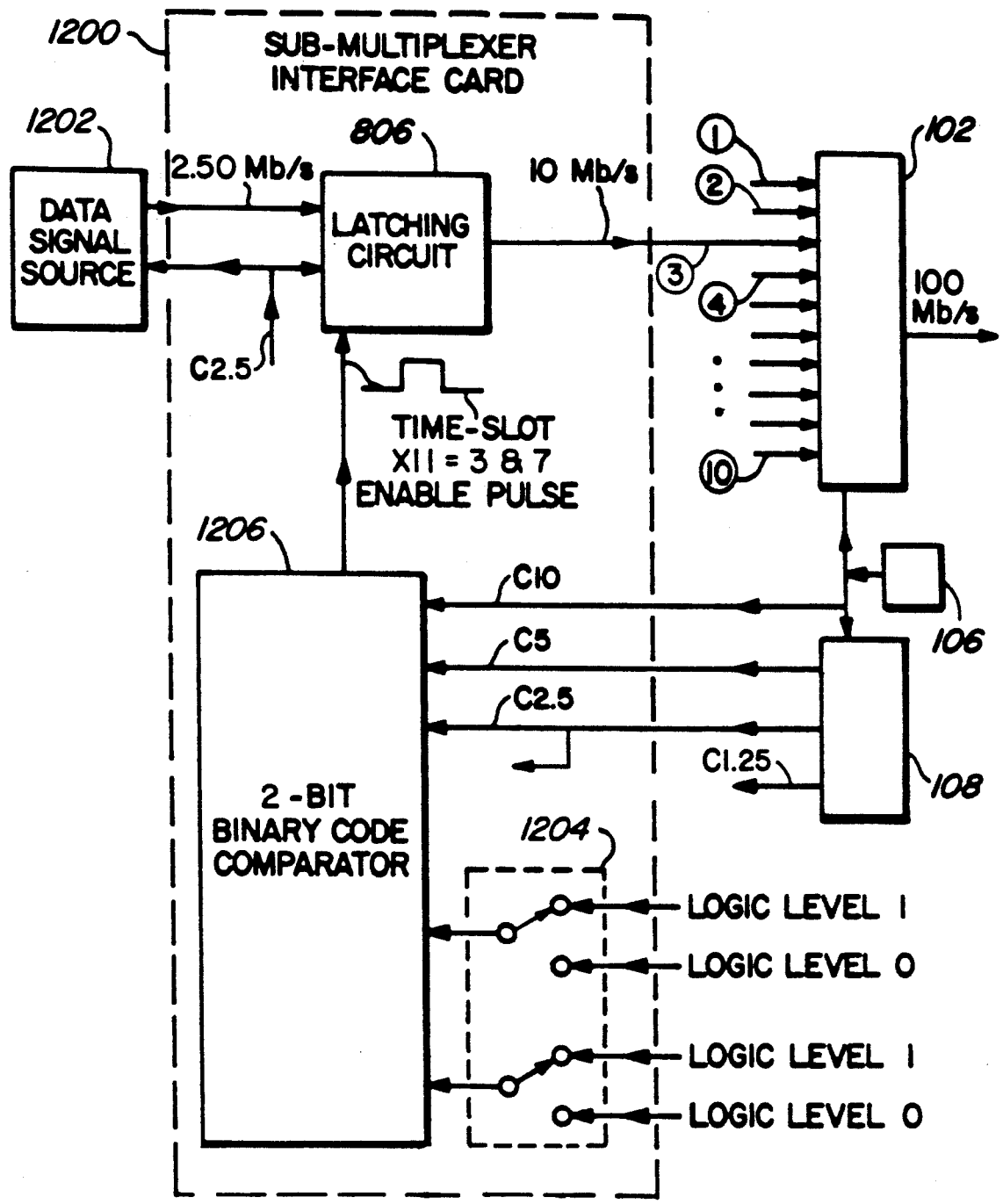
FIG. 12 is a block diagram illustrating an interface card for sub-multiplexing a 2.50 Mb/s data signal synchronously.
Figure 13:
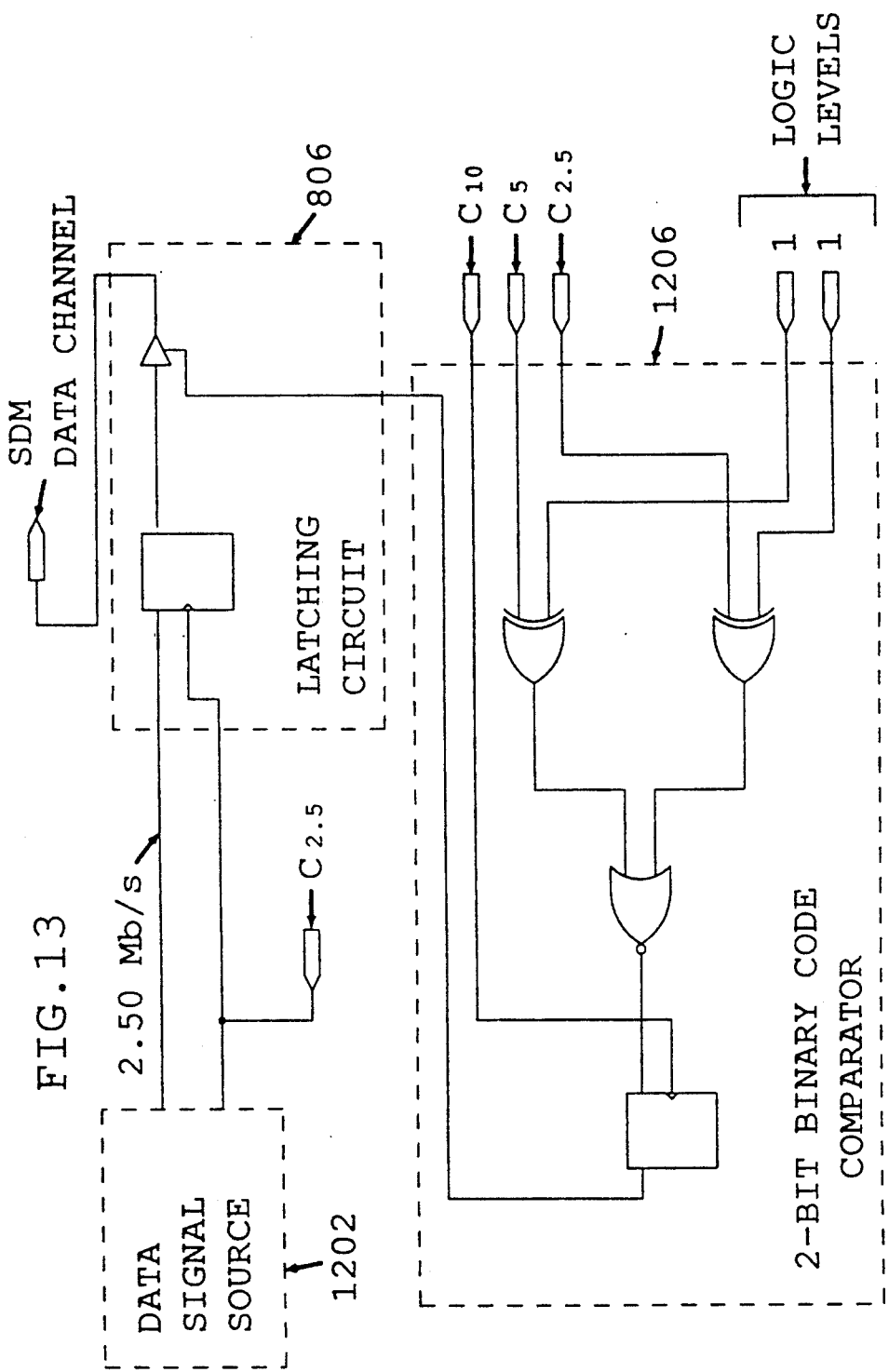
FIG. 13 is a circuit diagram of a multiplex sampling circuit that can be used to form part of the embodiment of FIG. 12.

FIG. 12 is a block diagram of an interface card 1200 that sub-multiplexes a 2.50 Mb/s data signal from an external data source 1202 on to the SDM data channel referenced with circled number 3 and FIG. 13 shows the circuit diagram corresponding to key portions of the block diagram. The TDM sub-channel time-slot chosen for sub-multiplexing is X11=3 & 7, the 4th and 8th time-slots in the sequence of 8 recurring time-slots. Here X is used to represent the highest order bit that is ignored. Referring to the TDM sub-channel time-slot Table in FIG. 2, as mentioned above, the binary value of 11 occurs at time-slots 3 & 7.

Since a single time-slot is a TDM sub-channel that accepts data rates of 1.25 Mb/s, 2 such TDM sub-channels will accept a:

$$1.25 \text{ Mb/s} \times 2 = 2.50 \text{ Mb/s}$$

data signal.

As in previous examples, the logic levels 11 for the TDM sub-channel time-slot addresses can be provided through a set of mechanical switches 1204 such as DIP switches or from an electronic source such as a microcontroller.

A 2-bit binary code comparator 1206 receives the logic address 11 and compares it to the logic levels of the clock signals $C_5$ and $C_{2.5}$ from the synchronous counter 108.

When the bit pattern 11 is detected, an enable pulse is sent to a latching circuit 806 in synchronization with the clock signal $C_{10}$. Then the incoming 2.50 Mb/s data signal from the data signal source 1202 is multiplex sampled and placed on to SDM data channel referenced with circled number 3.

Since the 2.50 Mb/s data signal must be in synchronization with the timing of the latching circuit, the $C_{2.5}$ clock signal is supplied to the data signal source 1202 as a reference.

SUB-DEMULTIPLEXING OF A 2.50 Mb/s DATA SIGNAL

Figure 14:
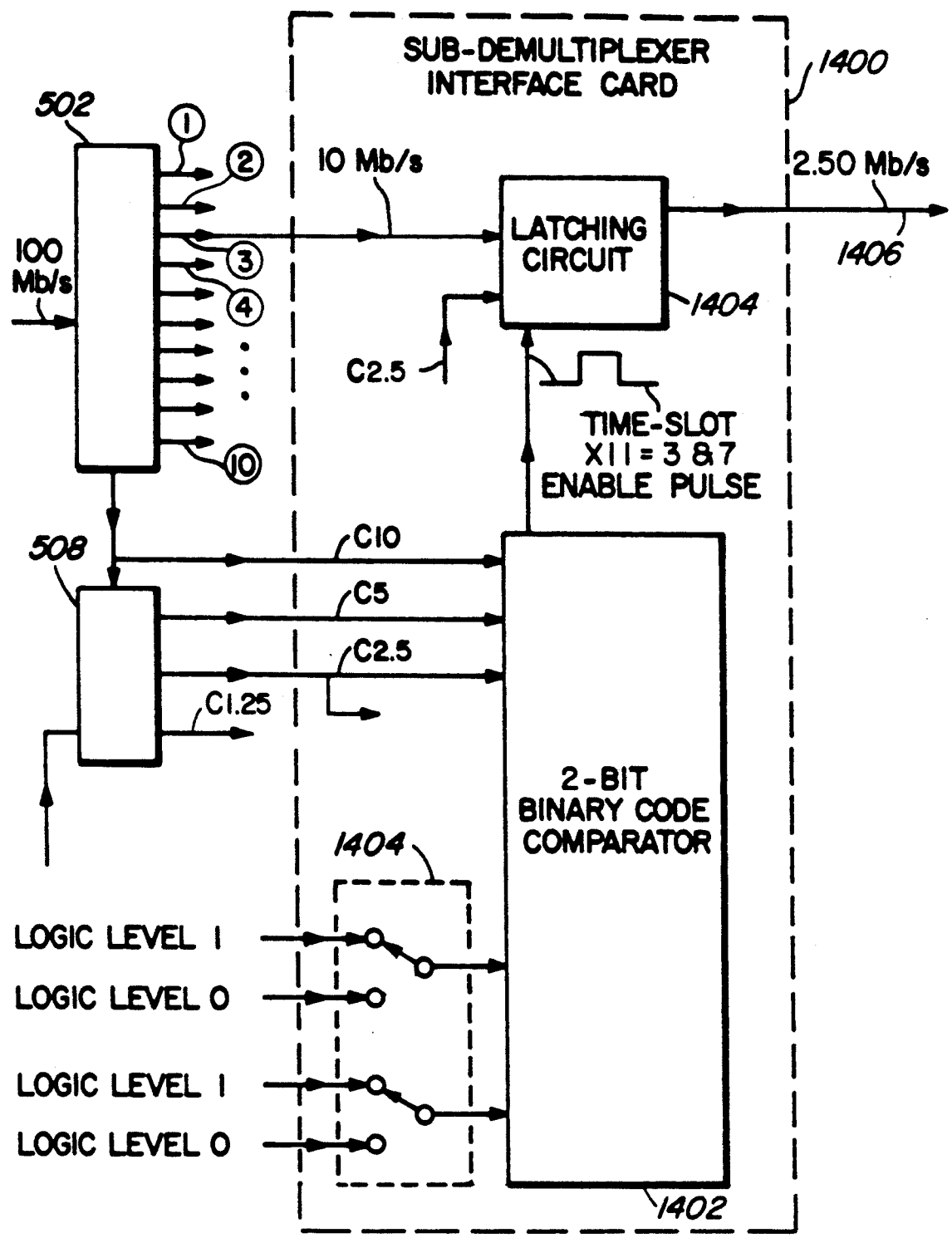
FIG. 14 is a block diagram illustrating an interface card for demultiplexing the 2.50 Mb/s data signal.
Figure 15:
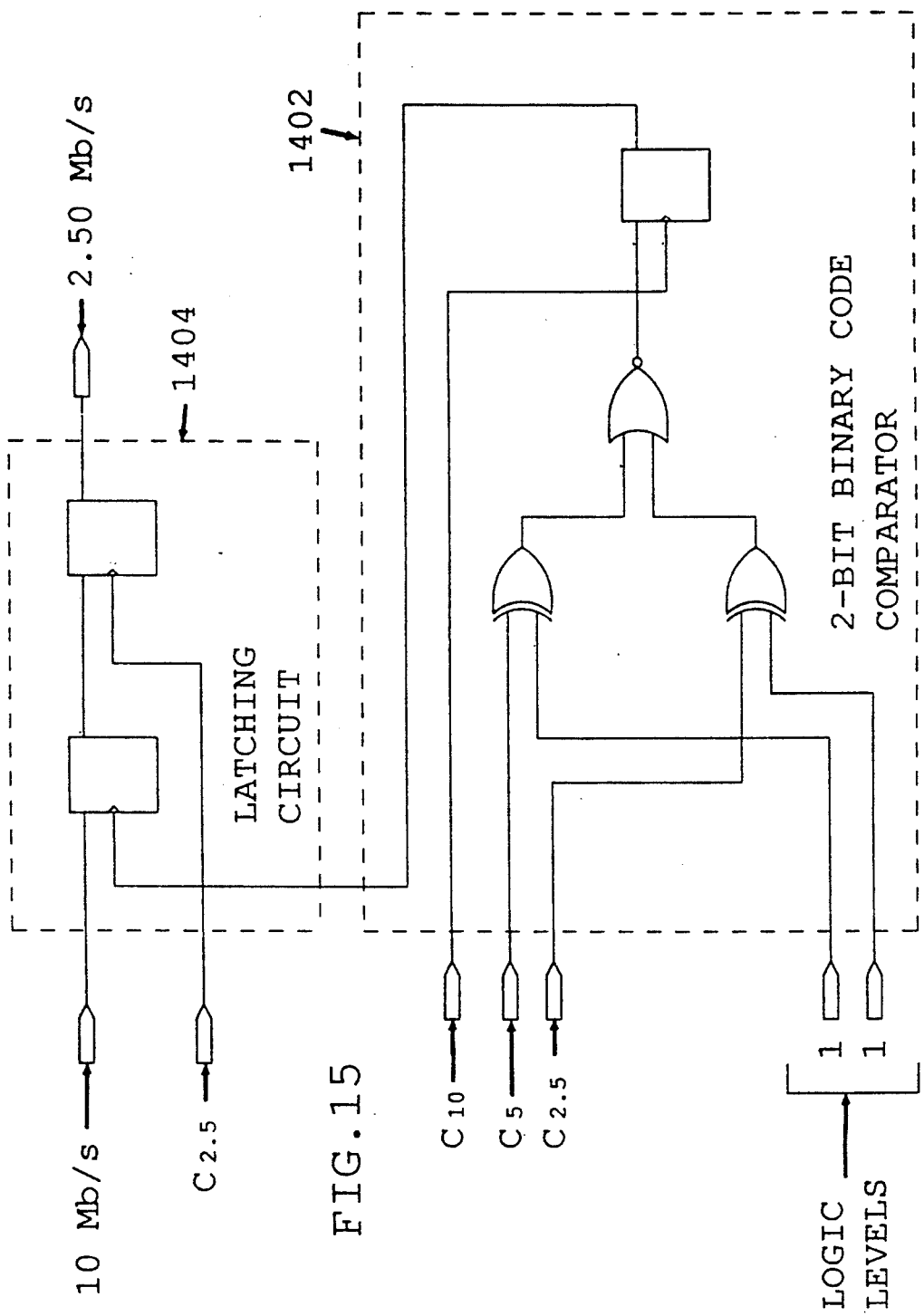
FIG. 15 is a circuit diagram of a demultiplex sampling circuit and data signal reconstruction circuit that can be used to form part of the embodiment of FIG. 14.

FIG. 14 shows a block diagram of an interface card 1400 that sub-demultiplexes a 2.50 Mb/s data signal and FIG. 15 shows the circuit diagram corresponding to key portions of the block diagram. This card is the counterpart to the interface card 1200 described above. It recovers the 2.50 Mb/s data signal that was multiplexed on to the SDM data channel referenced with circled number 3 and TDM sub-channel time-slots X11=3 & 7 of the multiplexer.

As in the preceding case of sub-multiplexing, a 2-bit binary comparator 1402 compares the 2-bit TDM sub-channel time-slot address code 11 with the clock signals $C_5$ and $C_{2.5}$ from the synchronous counter 508. The address code can, of course, be provided through a set of mechanical switches 1404 such as DIP switches or from an electronic source such as a microcontroller.

When the bit pattern 11 is detected, an enable pulse is sent to a latching circuit 1404 in synchronization with the clock signal $C_{10}$. The latching circuit extracts the sample bit belonging to the original 2.50 Mb/s data signal, reconstructs the original data signal bit and provides it to the output line 1406. Repeated operations reproduce the original signal. In this manner, the data signal sub-multiplexed into the TDM sub-channel time-slots X11=3 & 7 on the SDM data channel referenced with circled number 3, is sub-demultiplexed.

SUB-MULTIPLEXING OF A 5.00 Mb/s DATA SIGNAL

Figure 16:
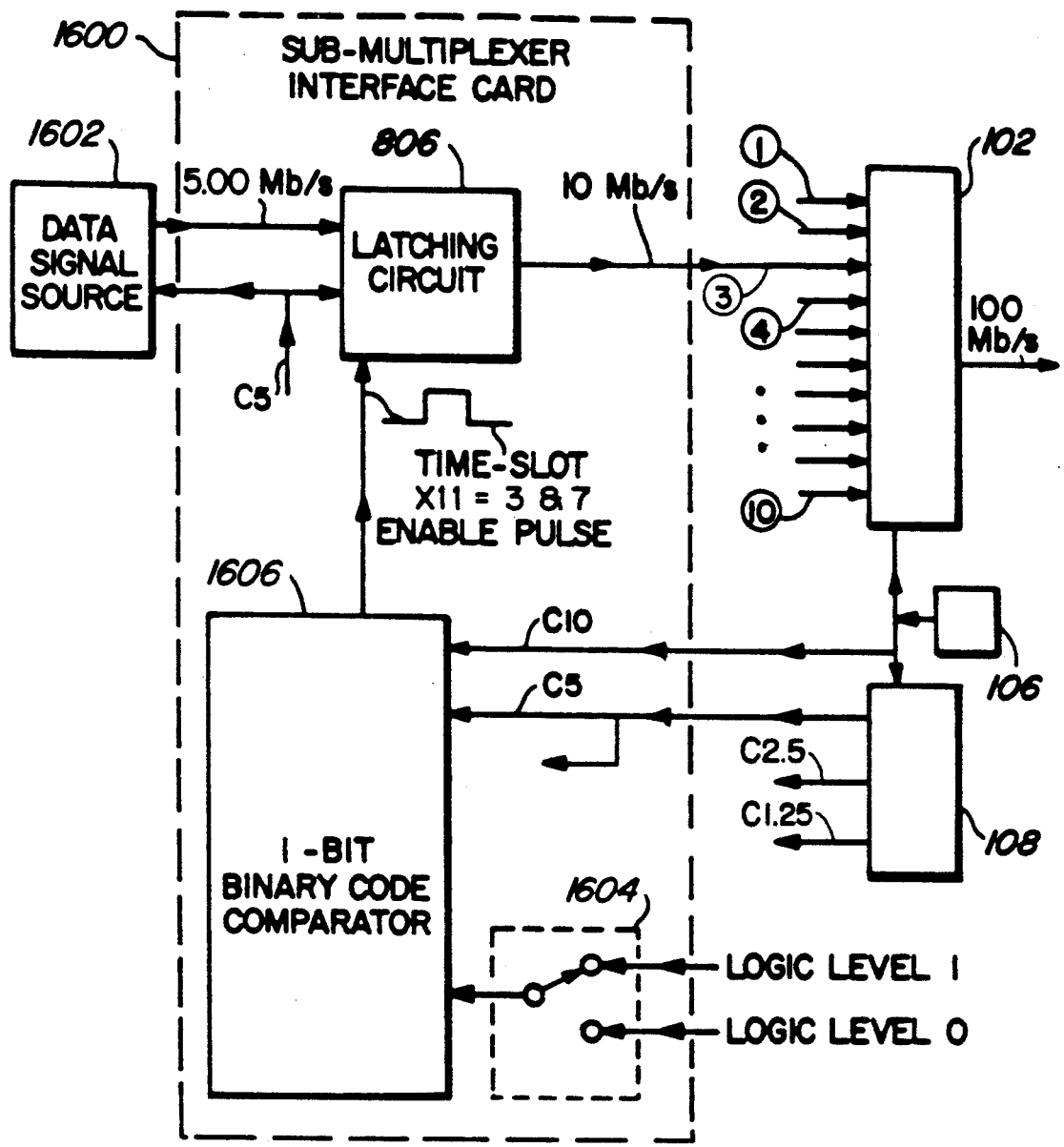
FIG. 16 is a block diagram illustrating an interface card for sub-multiplexing a 5.00 Mb/s data signal synchronously.
Figure 17:
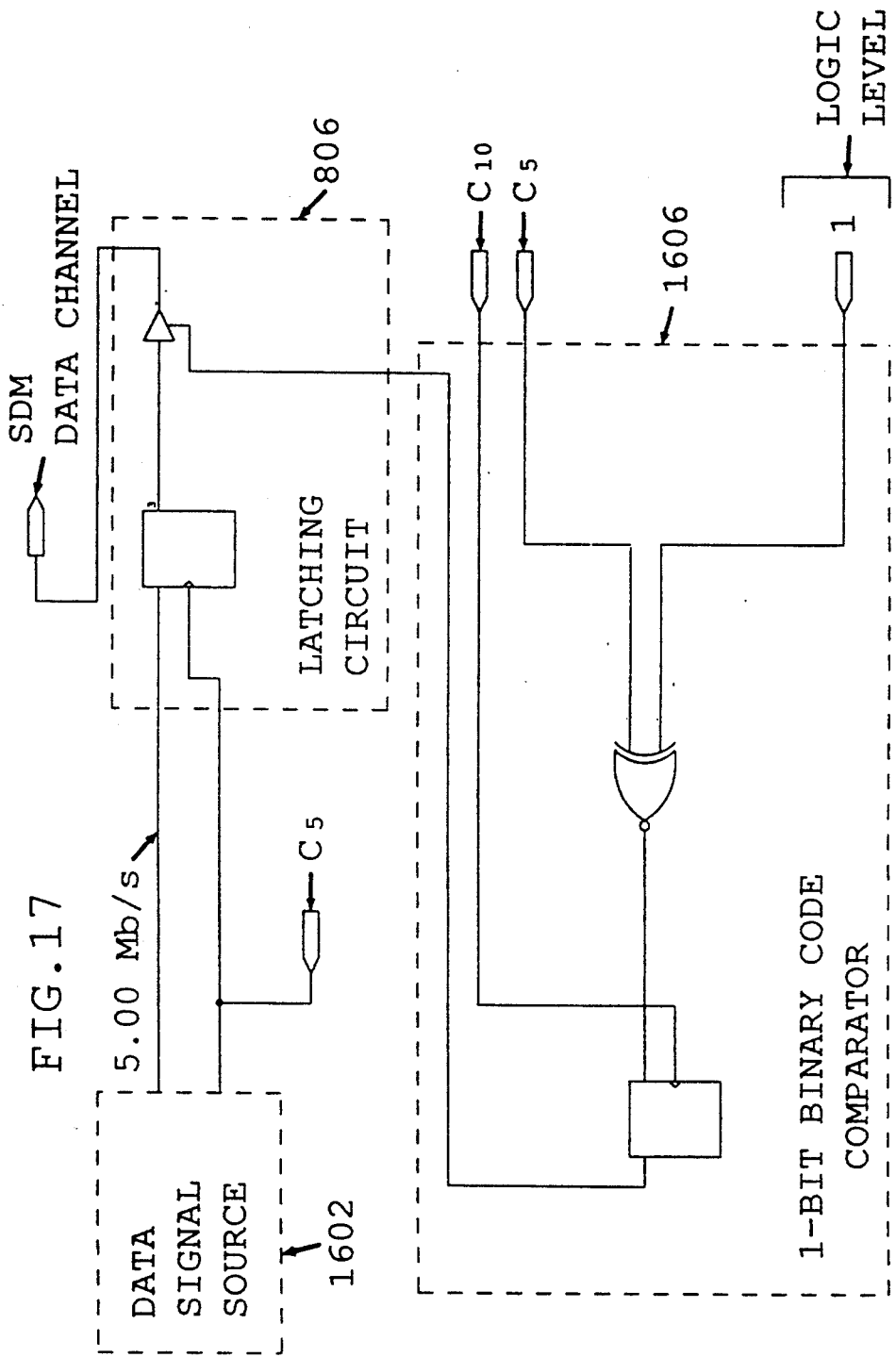
FIG. 17 is a circuit diagram of a multiplex sampling circuit that can be used to form part of the embodiment of FIG. 16.

FIG. 16 is a block diagram of an interface card 1600 that sub-multiplexes a 5.00 Mb/s data signal from an external data source 1602 on to the SDM data channel referenced with circled number 3 and FIG. 17 shows the circuit diagram corresponding to key portions of the block diagram. The TDM sub-channel time-slot chosen for sub-multiplexing is XX1=1, 3, 5 & 7, the 2nd, 4th, 6th and 8th time-slots in the sequence of 8 recurring time-slots.

Since a single time-slot is a TDM sub-channel that accepts data rates of 1.25 Mb/s, 4 such TDM sub-channels will accept a:

$$1.25 \text{ Mb/s} \times 4 = 5.00 \text{ Mb/s}$$

data signal.

As in previous examples, the logic level 1 for the TDM sub-channel time-slot addresses can be provided through a set of mechanical switches 1604 such as DIP switches or from an electronic source such as a microcontroller.

A 1-bit binary code comparator 1606 receives the logic address 1 and compares it to the logic levels of the clock signals $C_5$. When the bit pattern 1 is detected, an enable pulse is sent to a latching circuit 806 in synchronization with the clock signal $C_{10}$. Then the incoming 5.00 Mb/s data signal from the data signal source 1602 is multiplex sampled and placed on to the SDM data channel referenced with circled number 3.

Since the 5.00 Mb/s data signal must be in synchronization with the timing of the latching circuit, the $C_5$ clock signal is supplied to the data signal source 1602 as a reference.

SUB-DEMULTIPLEXING OF A 5.00 Mb/s DATA SIGNAL

Figure 18:
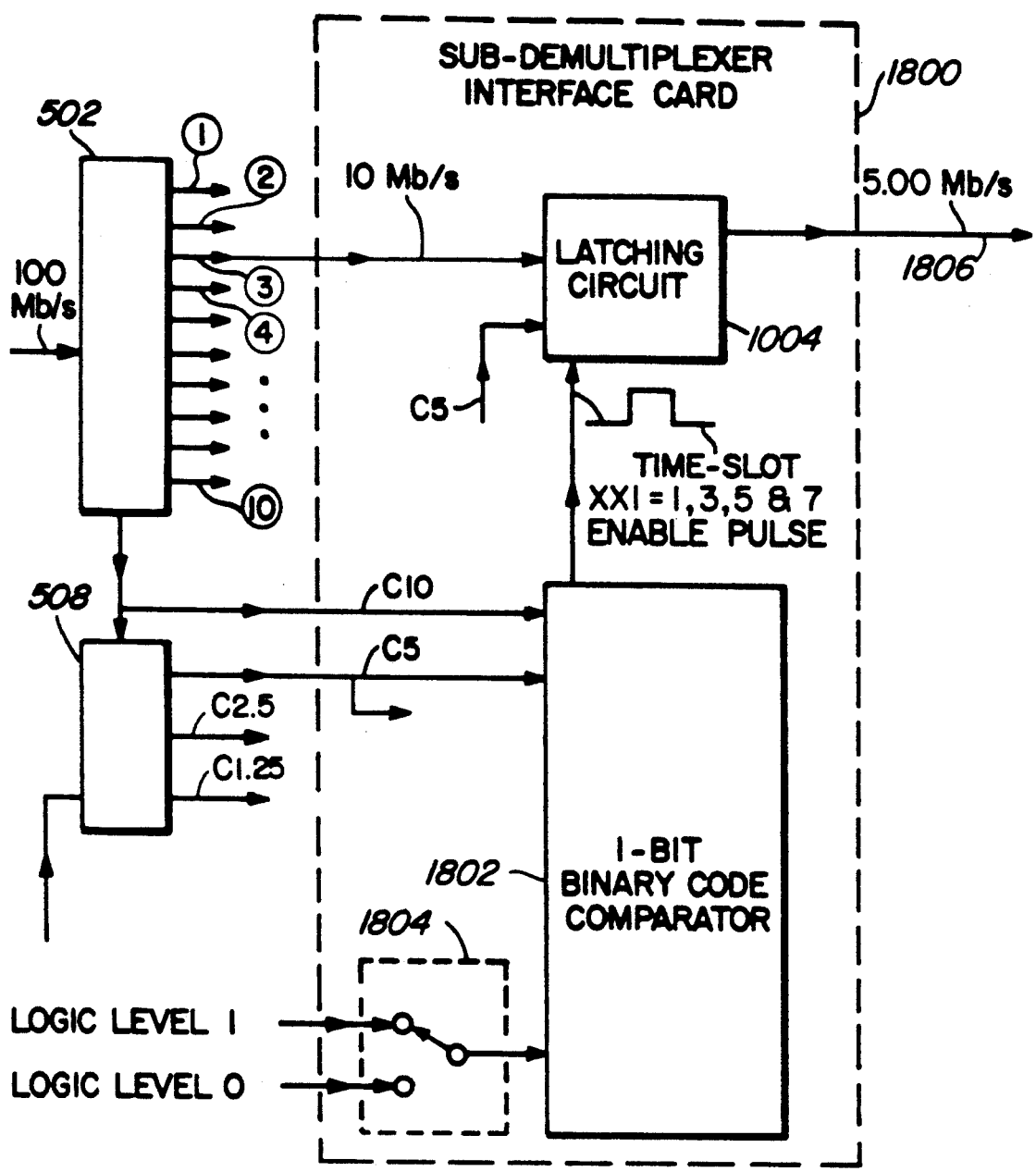
FIG. 18 is a block diagram illustrating an interface card for demultiplexing the 5.00 Mb/s data signal.
Figure 19:
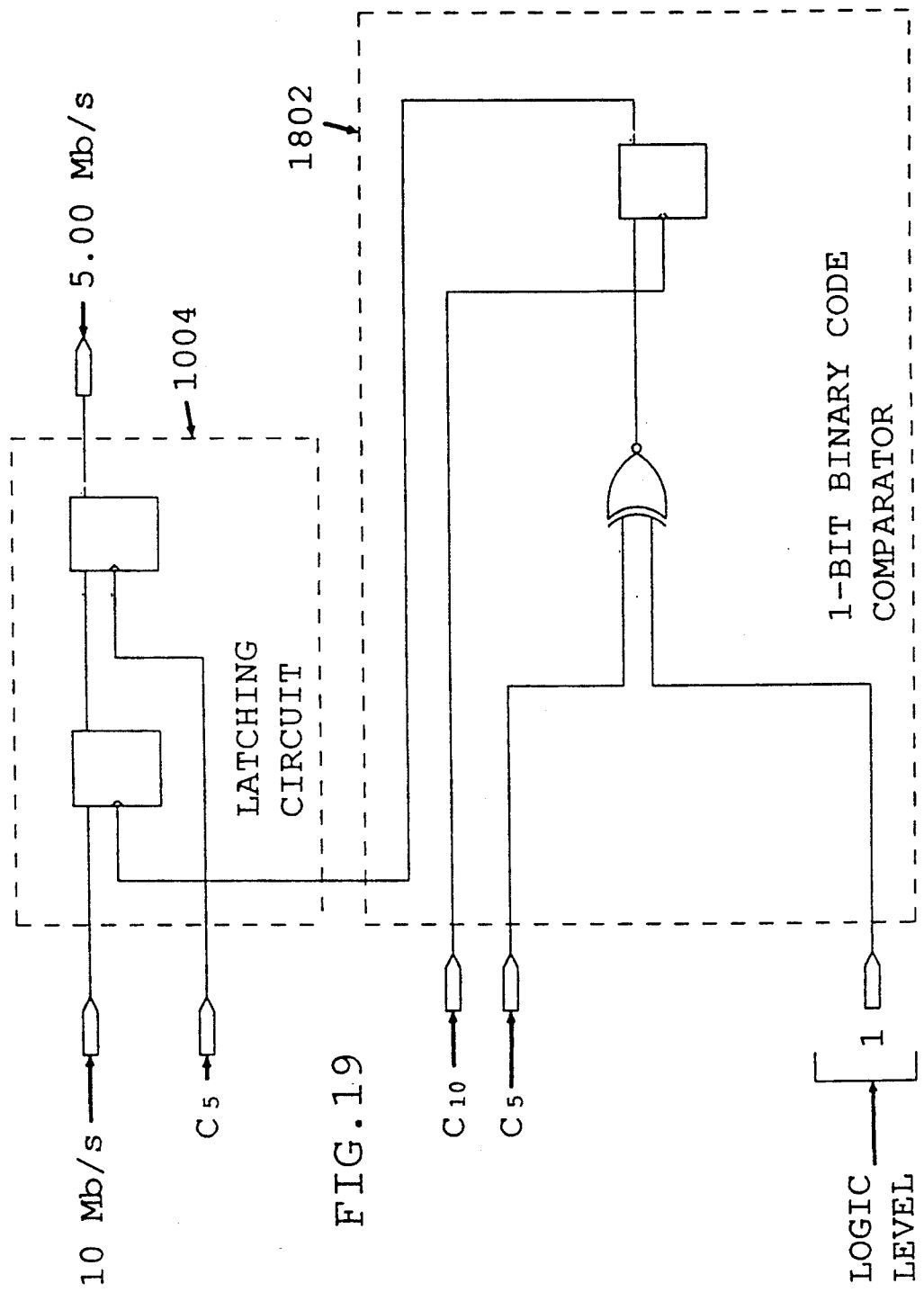
FIG. 19 is a circuit diagram of a demultiplex sampling circuit and data signal reconstruction circuit that can be used to form part of the embodiment of FIG. 18.

FIG. 18 shows a block diagram of an interface card 1800 that sub-demultiplexes a 5.00 Mb/s data signal and FIG. 19 shows the circuit diagram corresponding to key portions of the block diagram. This card is the counterpart to the interface card 1600 described above. It recovers the 5.00 Mb/s data signal that was multiplexed on to the SDM data channel referenced with circled number 3 and TDM sub-channel time-slots XX1=1, 3, 5 & 7 of the multiplexer.

As in the preceding case of sub-multiplexing, a 1-bit binary comparator 1802 compares the 1-bit TDM sub-channel time-slot address code 1 with the clock signals $C_5$ from the synchronous counter 508. This address code can, of course, be provided through a set of mechanical switches 1804 such as DIP switches or from an electronic source such as a microcontroller.

When the bit pattern 1 is detected, an enable pulse is sent to a latching circuit 1004 in synchronization with the clock signal $C_{10}$. The latching circuit extracts the sample bit belonging to the original 5.0 Mb/s data signal, reconstructs the original data signal bit and provides it to the output line 1806. Repeated operations reproduce the original signal. In this manner, the data signal sub-multiplexed into the TDM sub-channel time-slots XX1=3, 5 & 7 on the SDM data channel referenced with circled number 3, are sub-demultiplexed.

SUB-MULTIPLEXING OF A 1.25 Mb/s 4-BIT PARALLEL DATA SIGNAL

Digital data signals are not always in the form of a serial bit stream. In many cases parallel digital data signals such as those for printers, are encountered in personal computers.

Figure 20:
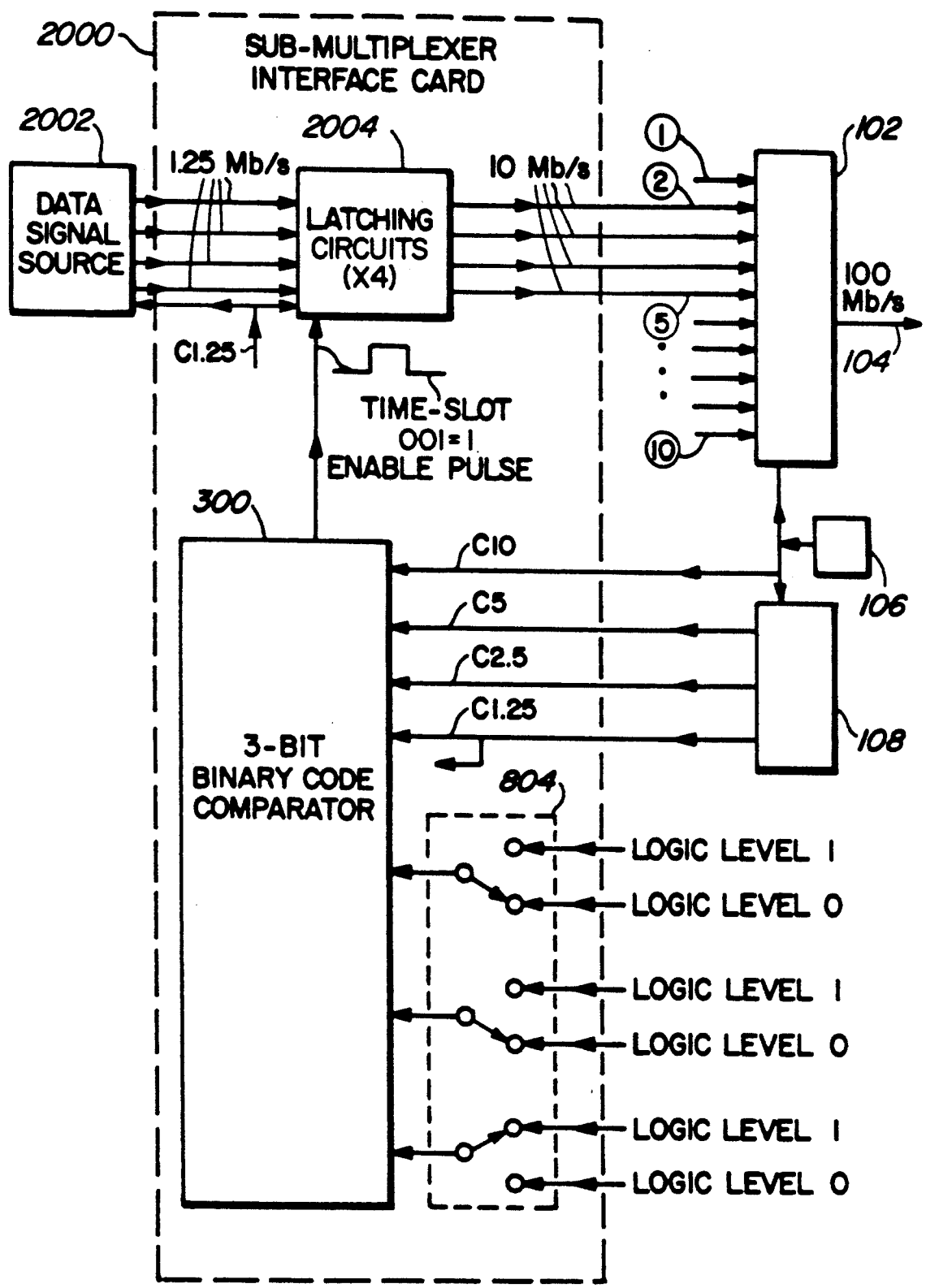
FIG. 20 is a block diagram illustrating an interface card for sub-multiplexing a 4-bit parallel 1.25 Mb/s data signal synchronously.
Figure 21:
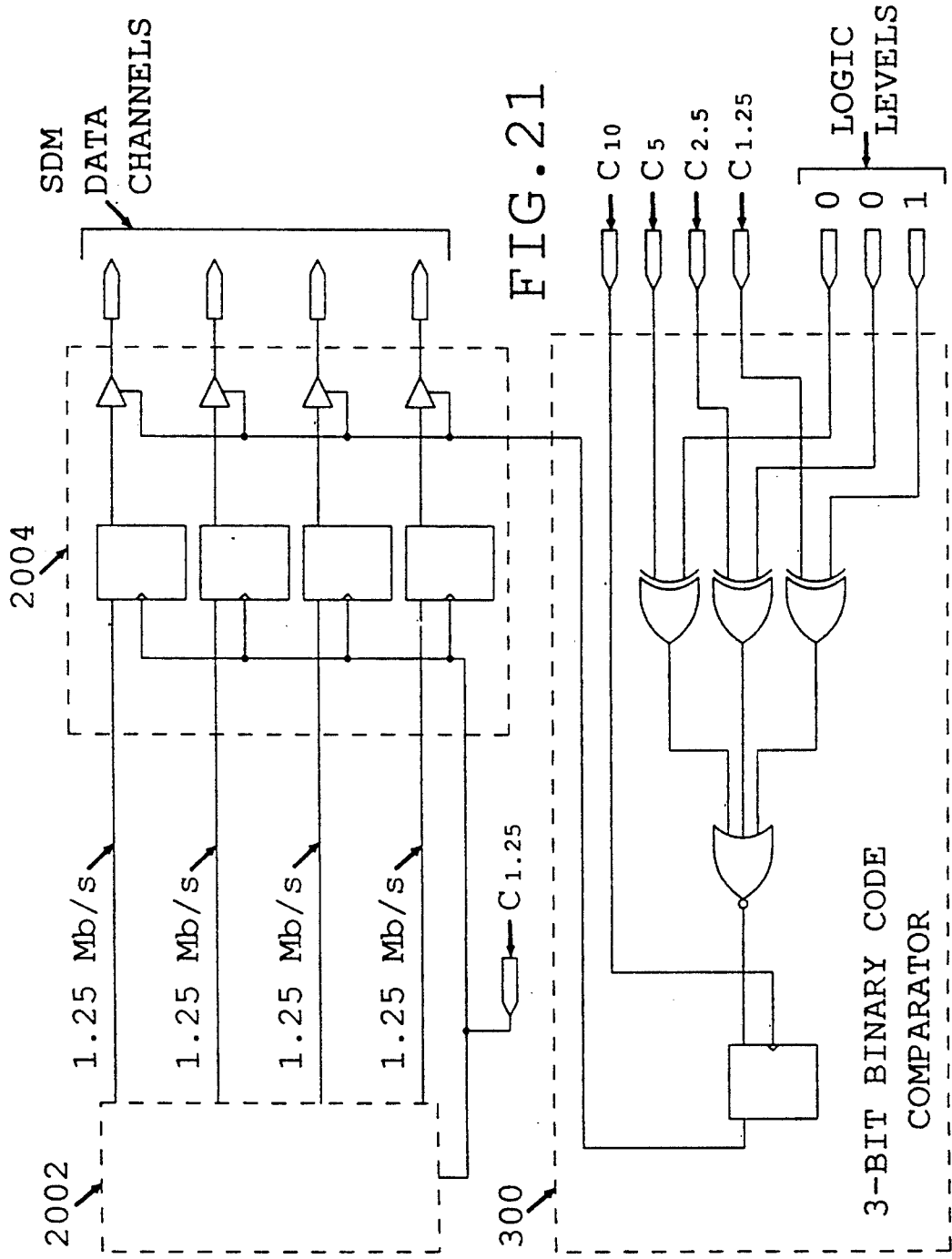
FIG. 21 is a circuit diagram of a multiplex sampling circuit that can be used to form part of the embodiment of FIG. 20.

FIG. 20 shows the block diagram of an example of an interface card 2000 that sub-multiplexes a 1.25 Mb/s 4-bit parallel data signal from an external data source 2002. FIG. 21 shows the circuit diagram of key portions of the block diagram.

The design and operation are similar to that of the case for sub-multiplexing a 1.25 Mb/s data signals as shown in FIGS. 8 and 9, except for the use of 4 parallel latching circuits 2204 in the place of 1.

SUB-DEMULTIPLEXING OF A 1.25 Mb/s 4-BIT PARALLEL DATA SIGNAL

Figure 22:
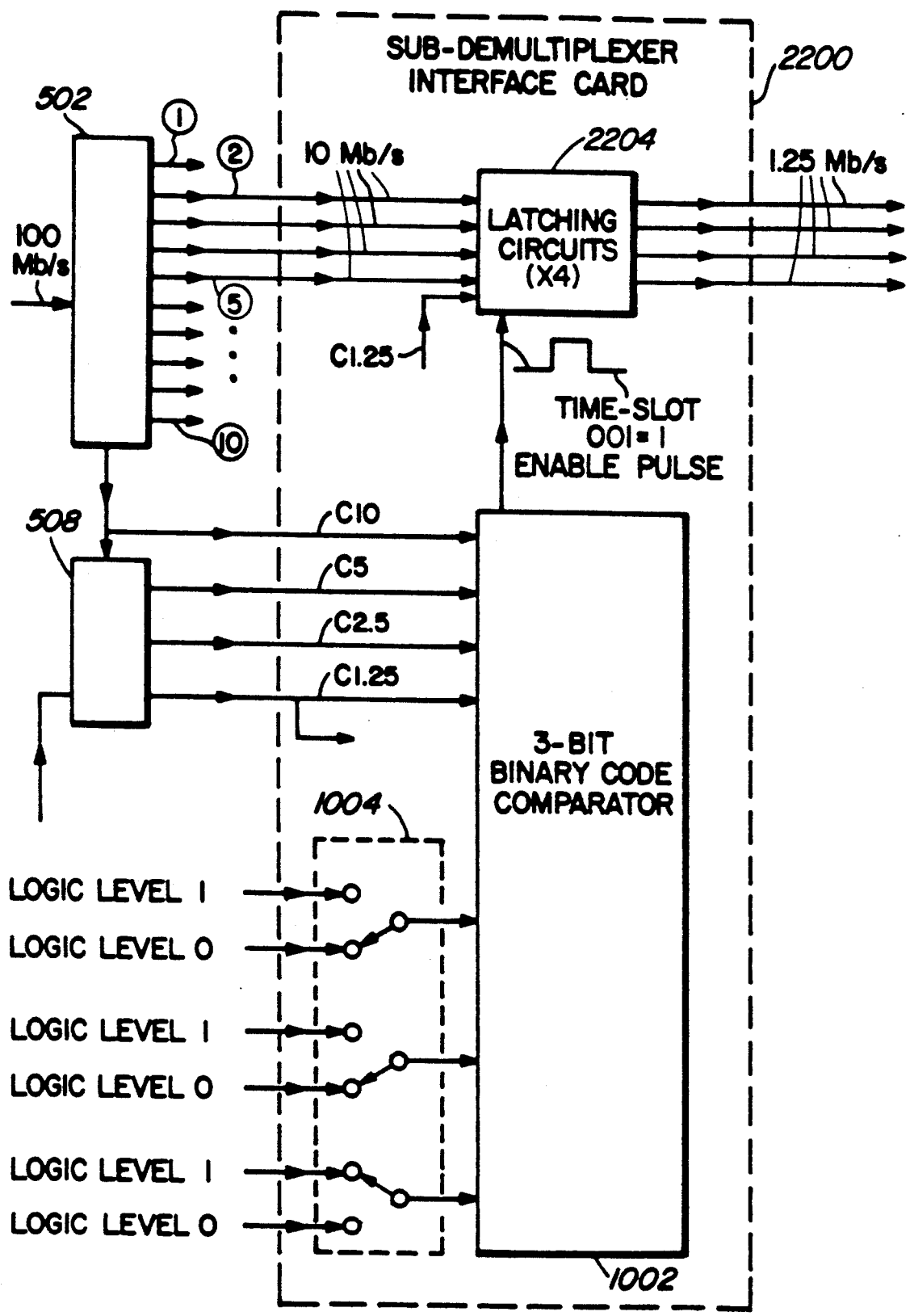
FIG. 22 is a block diagram illustrating an interface card for demultiplexing the 4-bit parallel 1.25 Mb/s data signal.

FIG. 22 shows a block diagram of an interface card 2200 that sub-demultiplexes the 1.25 Mb/s 4-bit parallel data signal from the external data source 2002, and FIG. 23 shows the circuit diagram corresponding to key portions of the block diagram. This card is the counterpart to the interface card 2000 described above.

The design and operation are similar to that of the case for sub-demultiplexing a 1.25 Mb/s data signal as shown in FIGS. 10 and 11, except for the use of 4 parallel latching circuits 2204 in the place of 1.

MULTIPLEXING OF A 10 Mb/s DATA SIGNAL

Figure 24:
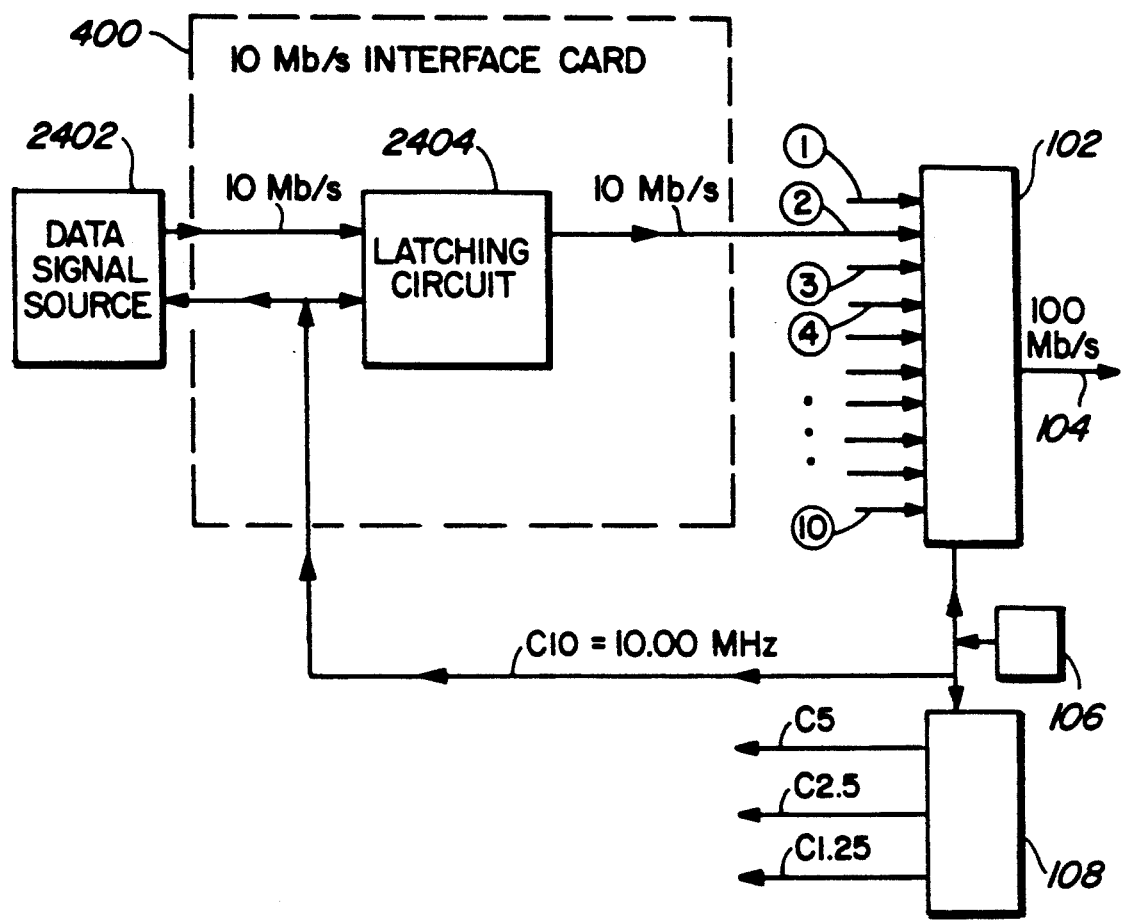
FIG. 24 is a block diagram illustrating an interface card for sub-multiplexing a 10 Mb/s data signal synchronously.

All of the preceding application examples make use of the TDM sub-channel time-slots on the SDM data channels. An SDM data channel can also be used to multiplex transmit a 10 Mb/s data signal synchronously. FIG. 24 shows a block diagram of an interface card 2400 that synchronously multiplexes a 10 Mb/s data signal from an external data source 2402.

The latching circuit 2404 samples the 10 Mb/s data signal from the external data source 2402, in synchronization with the 10 Mb/s bit rate of the SDM data channel and places the multiplex sample on to the SDM data channel referenced with circled number 2. The multiplex sampled data is transmitted as part of the 100 Mb/s bit stream on the output line 104 of the SDM multiplexer 102.

Since the 10 Mb/s data signal must be in synchronization with the timing of the latching circuit 2404, the $C_{10}$ clock signal is supplied to the data signal source 2402 as a reference.

DEMULTIPLEXING OF A 10 Mb/s DATA SIGNAL

Figure 25:
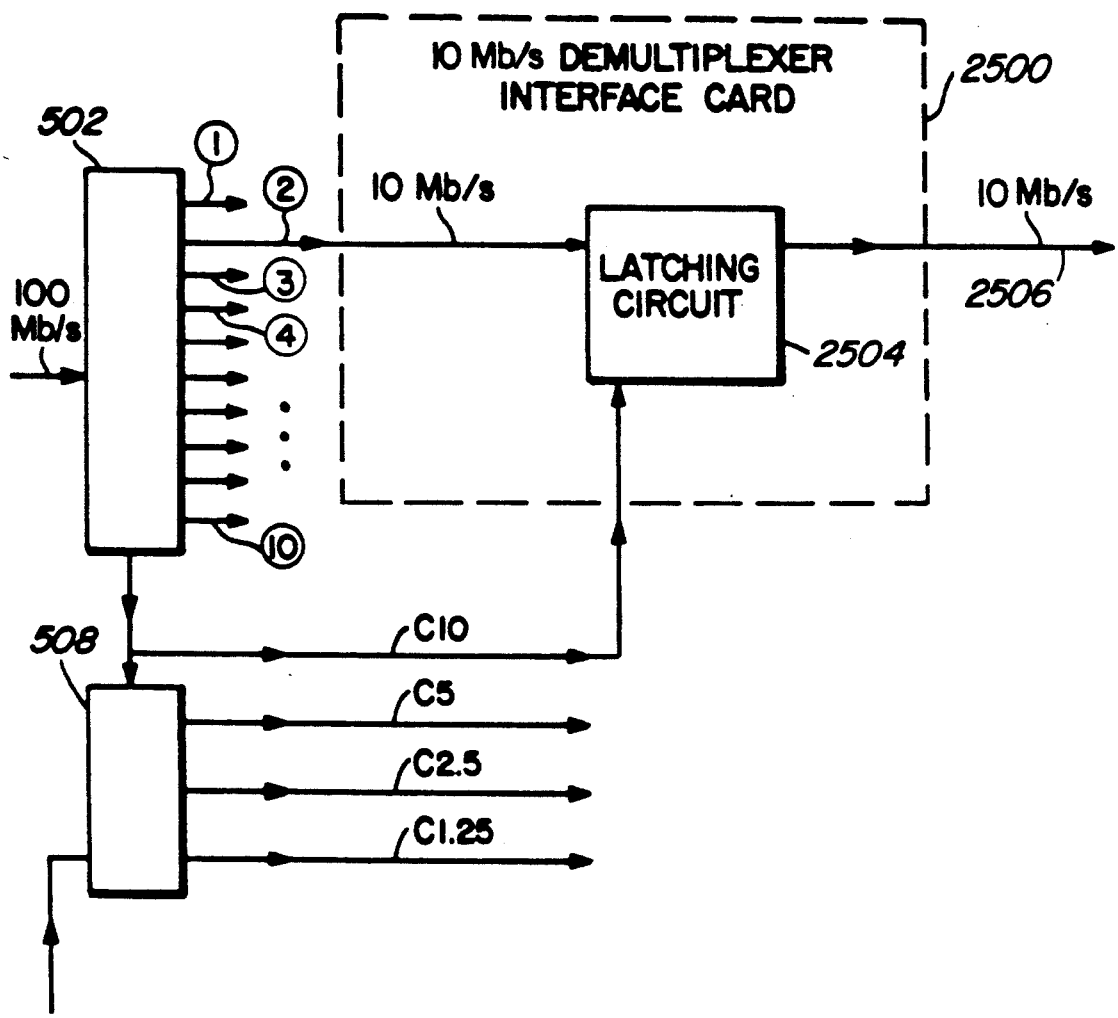
FIG. 25 is a block diagram illustrating an interface card for demultiplexing the 10 Mb/s data signal.

FIG. 25 shows a block diagram of an interface card 2500 that demultiplexes the 10 Mb/s multiplexed data signal. This card is the counterpart to the interface card 2400 described above. It recovers the 10 Mb/s data signal that was multiplexed on to the SDM data channel referenced with circled number 2. The latching circuit 2504 extracts the original 10 Mb/s data signal, and provides it to the output 2506.

SUB-MULTIPLEXING OF AN ASYNCHRONOUS 1.00 Mb/s DATA SIGNAL

All of the preceding application examples were concerned with synchronous multiplexing where the data signal was in phase and in synchronization with the multiplex sampling of the latching circuits.

Data signals with asynchronous bit rates with respect to the clock rates such as 1.25 MHz, 2.50 MHz, 5.00 MHz and 10 MHz, of the multiplexer-demultiplexer system, can still be multiplex transmitted synchronously if their bit rates are adjusted to match that of one of the clock rates that are available. The multiplexed transmission of an asynchronous 1.00 Mb/s data signal is discussed below.

Figure 26:
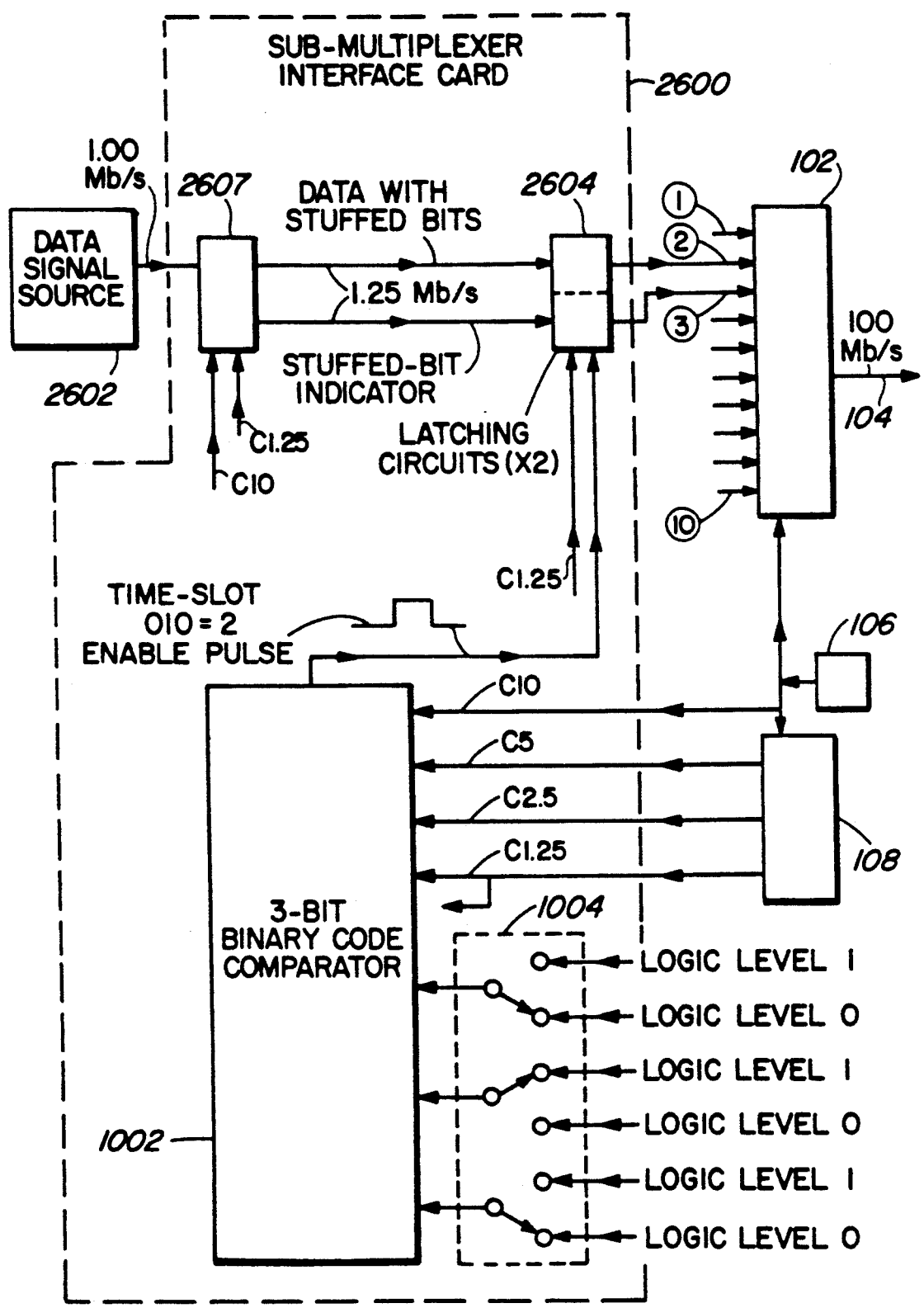
FIG. 26 is a block diagram illustrating an interface card for sub-multiplexing an asynchronous 1.00 Mb/s data signal.

FIG. 26 shows a block diagram of an interface card 2600 that multiplexes an asynchronous 1.00 Mb/s data signal from an external data source 2602, into the TDM sub-channel time-slot 010=2 on the SDM data channel referenced with circled number 2 of the multiplexer.

Well known combinations of electronic circuits 2607 that include circuits such as clock recovery, bit-stuffing and buffer circuits, are used to recover the clock frequency of 1.00 MHz from the 1.00 Mb/s data signal of an external data source 2602, and additional stuff-bits are added to the original 1.00 Mb/s data signal to adjust the data signal bit rate to 1.25 Mb/s. The adjusted data signal is then multiplex sampled synchronously into the TDM sub-channel time-slot 010=2 on the SDM data channel referenced with circled number 2.

By using well known circuits included in the electronic circuits 2607, the stuff-bits are identified by stuff-bit indicator signals that are synchronously multiplex transmitted through the TDM sub-channel time-slot 010=2 on the SDM data channel referenced with circled number 3.

The operation and design of the synchronous multiplexing circuits, the 3-bit binary code comparator 1002 and latching circuits 2604, are identical to that of FIGS. 20 and 21 except that only 2 latching circuits are used instead of 4.

SUB-DEMULTIPLEXING OF AN ASYNCHRONOUS 1.00 Mb/s DATA SIGNAL

Figure 27:
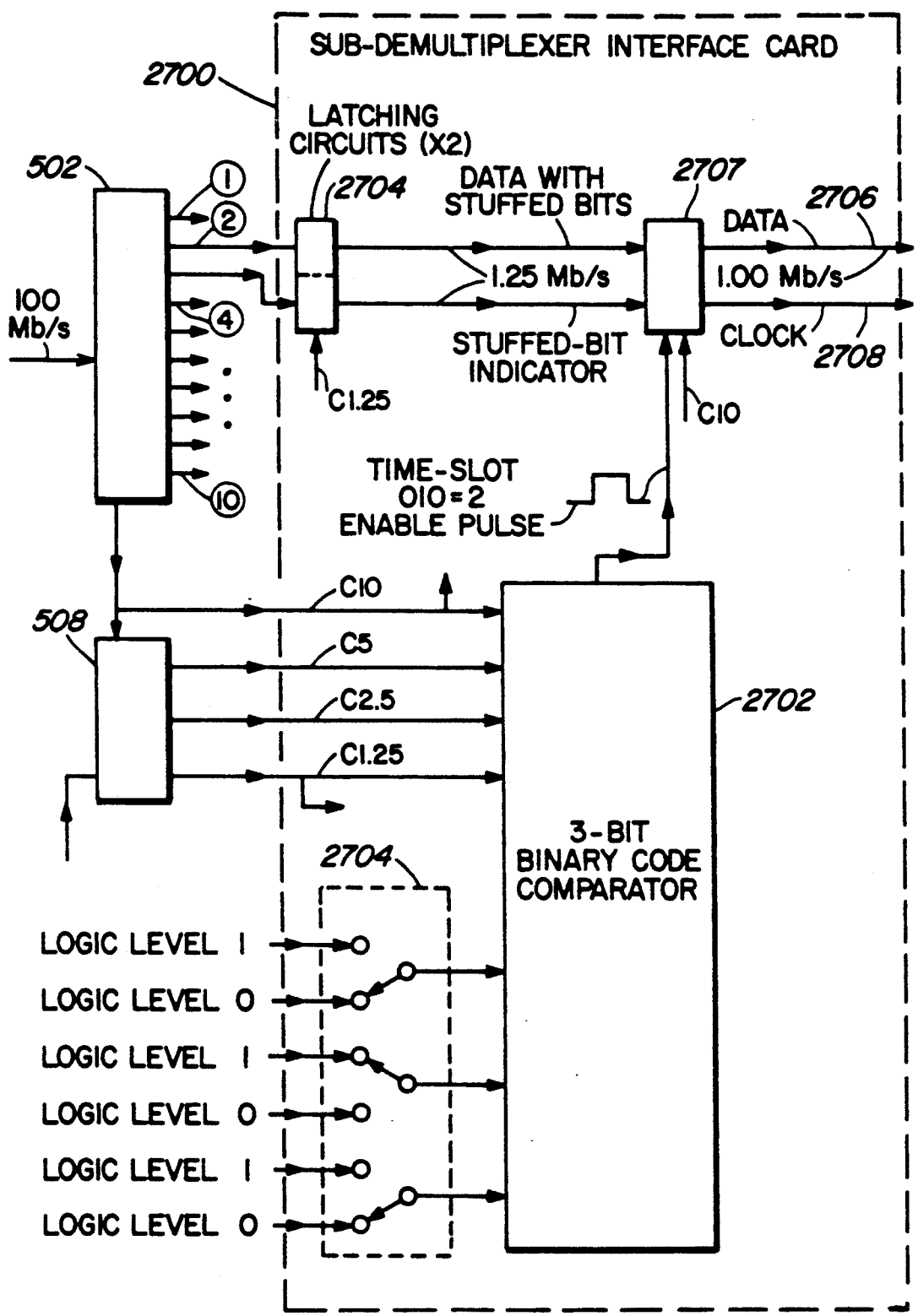
FIG. 27 is a block diagram illustrating an interface card for demultiplexing the 1.00 Mb/s data signal.

FIG. 27 shows a block diagram of an interface card 2700 that sub-demultiplexes the 1.00 Mb/s data signal. This card is the counterpart to the interface card 2600 described in FIG. 26. It recovers the 1.00 Mb/s data signal that was multiplexed into the TDM sub-channel time-slot 010=2 on the SDM data channel referenced with circled number 2 and places the recovered signal on to the output line 2706.

The interface card 2700 also recovers the 1.00 Mb/s data signal that was multiplexed into the TDM sub-channel time-slot 010=2 on the SDM data channel referenced with circled number 3 and places the recovered clock signal on to the output line 2708.

The latching circuit 2704 extracts the sample bits belonging to the 1.25 Mb/s data signal with stuff-bits, reconstructs a 1.25 Mb/s data signal and provides it to the electronic circuits 2707. The latching circuit 2704 also extracts the 1.25 Mb/s stuff-bit indicator signal and provides it to the electronic circuits 2707.

By using well known combinations of circuits such as the bit-destuffer, buffer and tracking clock generator that are contained in the electronic circuits 2707, the stuff-bits are identified by the stuff-bit indicator signals and removed from the 1.25 Mb/s which is converted back to the original 1.00 Mb/s data signal. The tracking clock generator is used to recreate the original 1.00 MHz clock signal which is also provided as an output on the output line 2708.

The operation and design of the synchronous demultiplexing circuits, the 3-bit binary code comparator 2702 and latching circuits 2704, are identical to that of FIGS. 22 and 23 except that only 2 latching circuits are used instead of 4.

ASYNCHRONOUS SUB-MULTIPLEXING BY HIGH SPEED OVERSAMPLING

Figure 28:
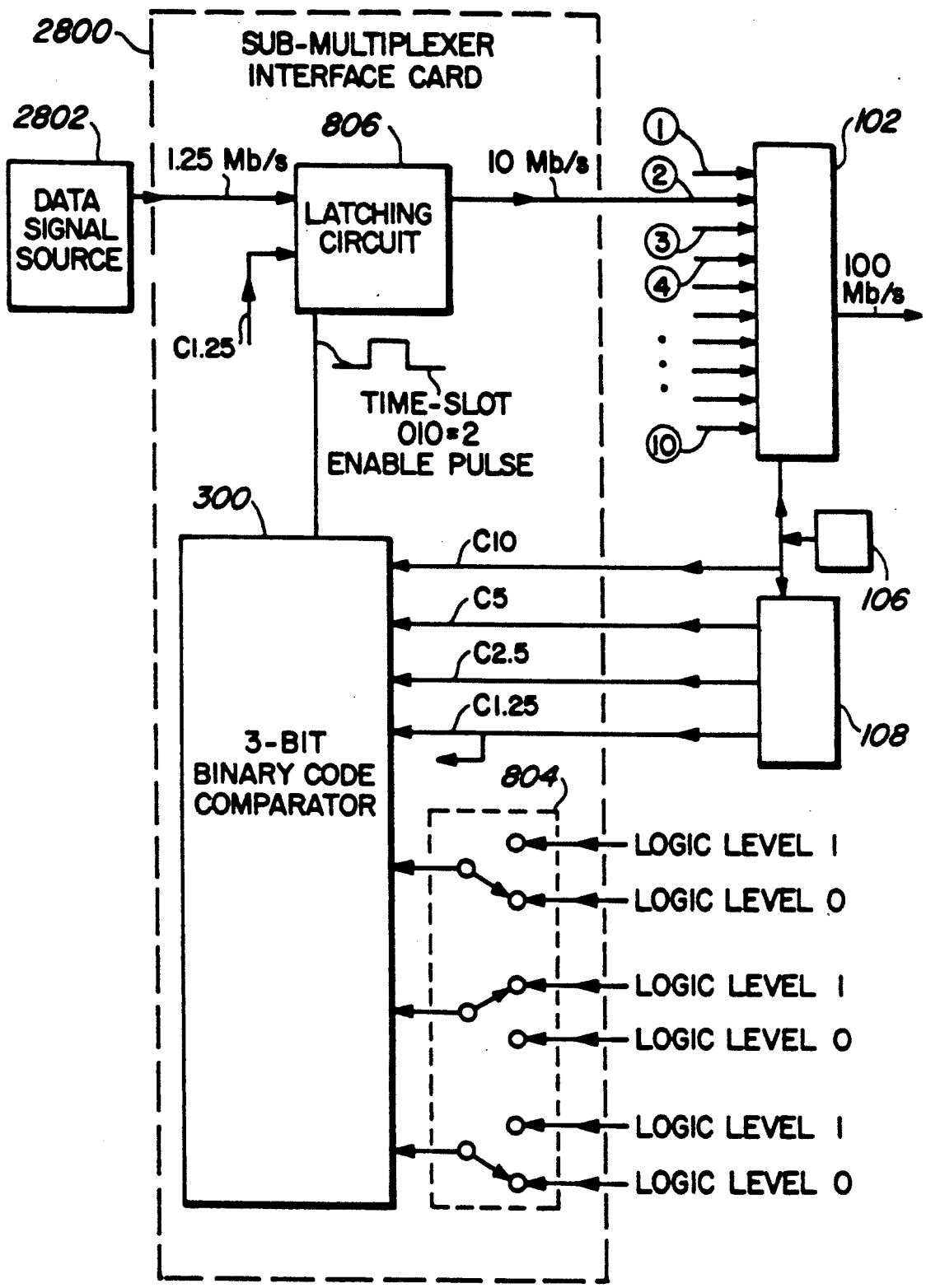
FIG. 28 is a block diagram illustrating an interface card for sub-multiplexing a DC to 125 kb/s data signal by asynchronous high speed over-sampling.

FIG. 28 shows a block diagram of an interface card 2800 that asynchronously sub-multiplexes a data signal that may have a bit rate ranging from DC to 125 kb/s from an external data source 2802, into the TDM su time-slot 010=2 on the SDM data channel referenced with circled number 2 of the multiplexer.

The multiplexing is performed by high speed oversampling at 1.25 Mb/s. The design and operation of the circuits are identical to that of FIGS. 8 and 9 except that the clock signal C1.25 is not supplied to the data signal source.

ASYNCHRONOUS SUB-DEMULTIPLEXING A HIGH SPEED OVERSAMPLED SIGNAL

Figure 29:
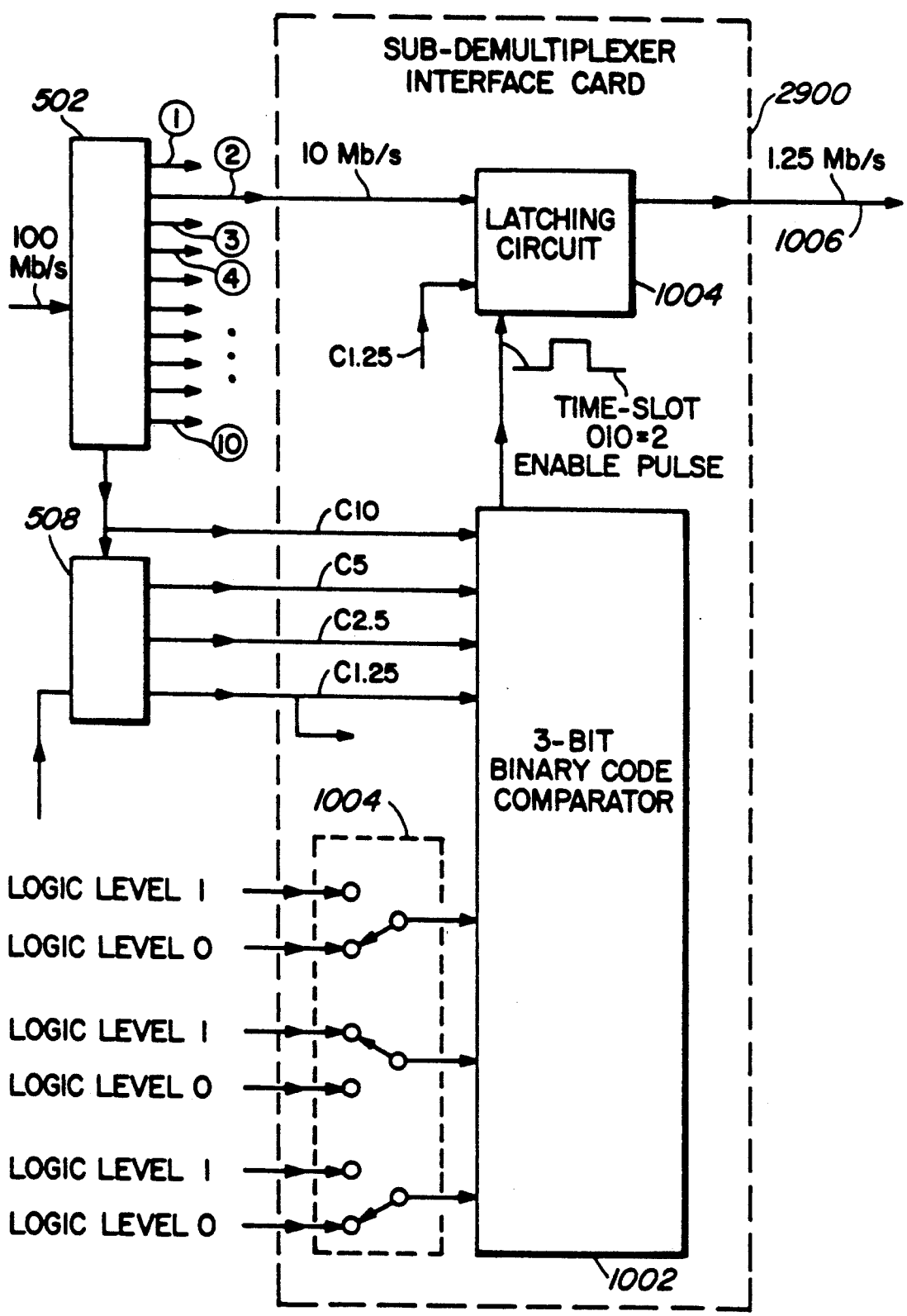
FIG. 29 is a block diagram illustrating an interface card for demultiplexing the DC to 125 kb/s data signal.

FIG. 29 shows a block diagram of an interface card 2900 that sub-demultiplexes the DC to 125 kb/s data signal. This card is the counterpart to the interface card 2800 described in FIG. 28. It recovers the DC to 125 kb/s data signal that was multiplexed into the TDM sub-channel time-slot 010=2 on the SDM data channel referenced with circled number 2 and, places the recovered signal on to the output line 1006.

The design and operation of the circuits are identical to that of FIGS. 10 and 11.

SUB-MULTIPLEXING OF A 20 Mb/s DATA SIGNAL BY DESERIALIZATION

Figure 30:
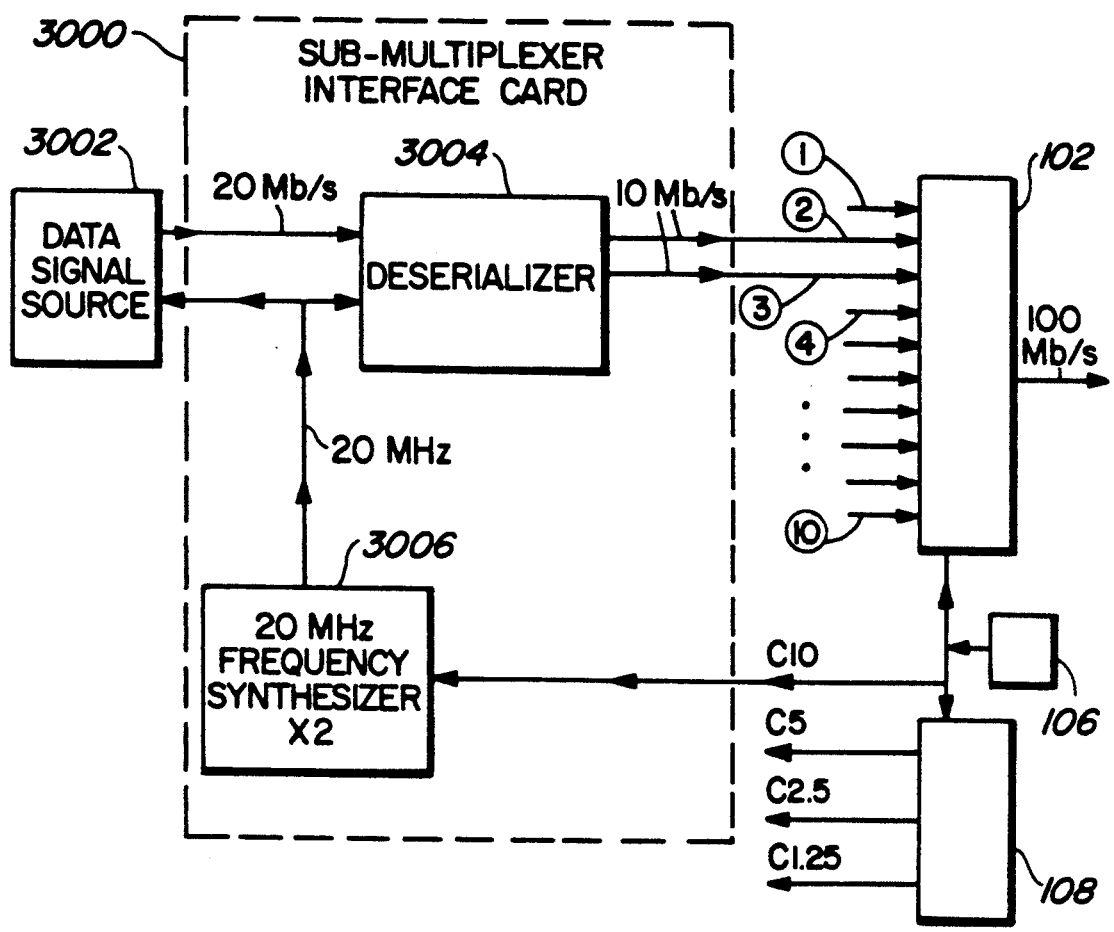
FIG. 30 is a block diagram illustrating an interface card for sub-multiplexing a 20 Mb/s data signal synchronously by first deserializing the data signal.

Data signals with bit rates higher than the 10 Mb/s bit rate of the SDM data channels can also be sub-multiplexed by deserializing the data signal into parallel bit streams. FIG. 30 shows a block diagram of an interface card 3000 that sub-multiplexes a 20 Mb/s data signal from an external data source 3002 on to the SDM data channels referenced with circled number 2 and 3 of the multiplexer.

The 20 Mb/s data signal is first deserialized into 2-parallel 10 Mb/s signals by a deserializer 3004. A 20 MHz clock signal is provided by a frequency doubler circuit 3006 to the deserializer 3004 for this purpose. The parallel 10 Mb/s signals are then placed on to SDM data channels referenced with circled number 2 and 3. The sub-multiplexed parallel 10 Mb/s signals are then transmitted as part of the 100 Mb/s multiplexed data bit steam.

Since the deserialized 10 Mb/s data signal must be in synchronization with the timing of the 10 Mb/s bit rate of the SDM data channels, the 20 MHz clock signal is supplied to the data signal source 3002 as a reference.

SUB-DEMULTIPLEXING OF A 20 Mb/s DATA SIGNAL BY RESERIALIZATION

Figure 31:
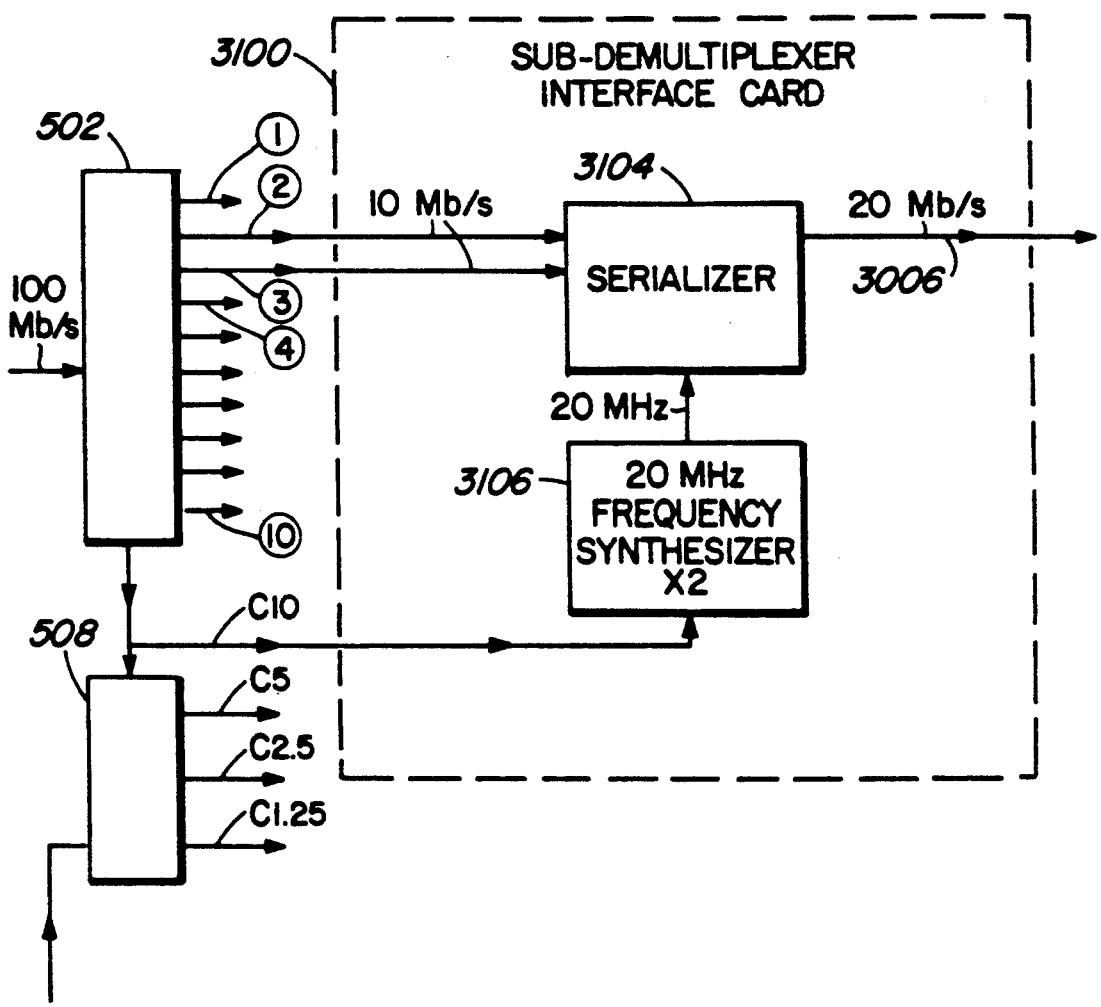
FIG. 31 is a block diagram illustrating an interface card for demultiplexing the 20 Mb/s data signal by reconstruction through serialization.

FIG. 31 shows a block diagram of an interface card 3100 that sub-demultiplexes the 2 parallel 10 Mb/s data signals. This card is the counterpart to the interface card 3000 described in FIG. 30. It recovers the 2 parallel 10 Mb/s data signals that were multiplexed on to the SDM data channels referenced with circled number 2 and 3, serializes them into the original 20 Mb/s data signal and places the recovered signal on to the output line 3006. A 20 MHz clock signal is provided by a frequency doubler circuit 3106 to the serializer for this operation.

ELECTRONIC SELECTION OF SDM DATA CHANNELS

The selection of an SDM data channel in the multiplexer-demultiplexer system can be accomplished either at the PC board socket by a contact on the connector section of the interface card PC board, or by a wire connection to the contact, or by a connection through mechanical switches to the contact, or by a connection through an electronic circuit (i.e. spatial) switch to the contact.

Figure 32:
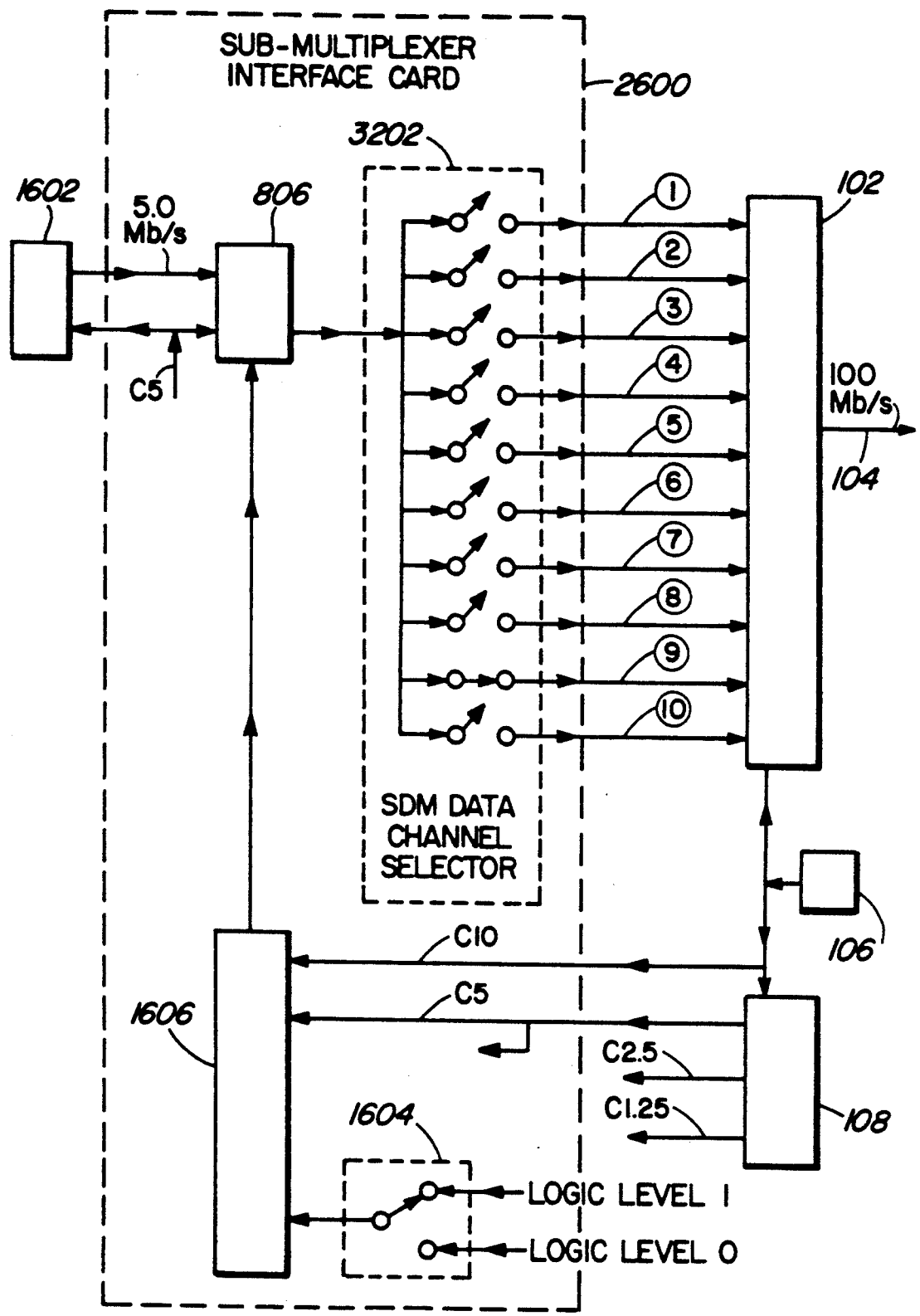
FIG. 32 is a block diagram illustrating a multiplexer using a set of switches to allocate the SDM data channel in accordance with an embodiment of the invention.
Figure 33:
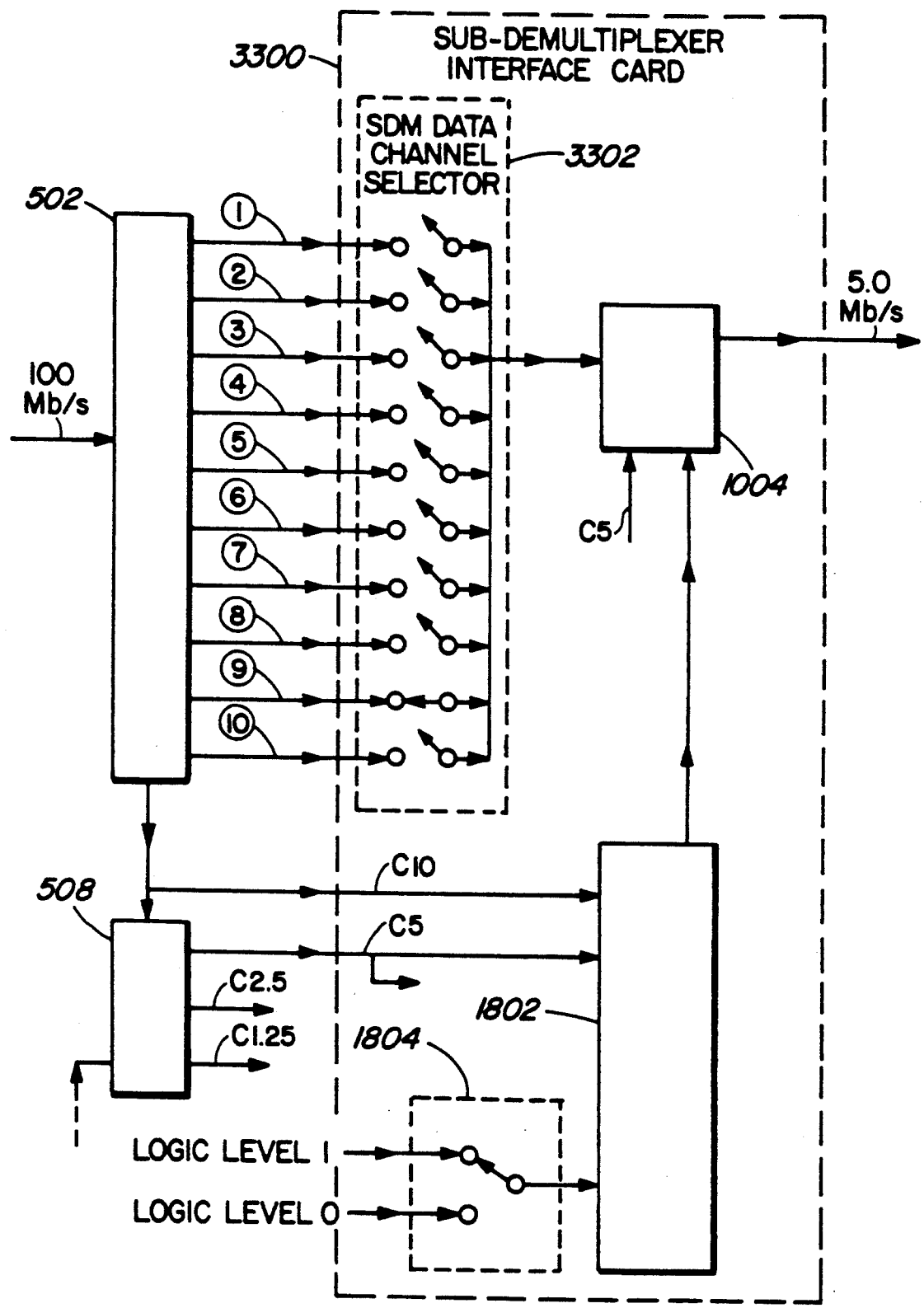

FIGS. 32 and 33 show an arrangement for switch-selecting an SDM data channel in a multiplexer and a demultiplexer, respectively. The example is for synchronously sub-multiplexing and sub-demultiplexing a 5.00 Mb/s data signal, similar to the embodiments of FIGS. 16 and 18.

An array of SPST (Single-Pole Single-Throw) mechanical switches 3202 and 3302 such as DIP switches ca be used to provide flexibility in assigning the 10 SDM data channels.

For remote selection, a series of electrical relays might be used but more practically, an array of electronically controlled semiconductor switches contained in a single integrated circuit such as the model DG535 manufactured by Siliconix, Inc., can be used. Electronic logic signals from a microcontroller, microprocessor or personal computer can be used to control these semiconductor switches.

It should be noted that the speed of switching is not an issue for this array of switches because once a switch is closed, it remains closed for the duration of the application.

ELECTRONIC SELECTION OF TDM SUB-CHANNEL TIME SLOTS

The selection of a TDM sub-channel time-slot can be accomplished by simply wire-connecting the necessary logic levels of a binary code to the binary code comparator. Alternatively, the selection of a TDM sub-channel time-slot can be achieved electronically through a set of semiconductor switches similar to the DG535. The switches specifying TDM sub-channel time-slots such as those indicated in FIGS. 8, 10, 12, 14 16, 18, 20, 22, 26, 27, 28, 29, 32 and 33 can be replaced by such semiconductor switches.

As still another approach in selecting a TDM sub-channel time-slot, the logic address signals to the binary code comparator that produces the TDM sub-channel time-slot selection enable pulse, can be supplied from a microcontroller, microprocessor or personal computer.

REMOTE IDENTIFICATION OF INTERFACE CARDS AND SELECTION OF SDM DATA CHANNELS AND TDM SUB-CHANNEL TIME-SLOTS

When an interface card is inserted into a multiplexer-demultiplexer system discussed above, remote identification of the functionality of the card as well as the number (i.e. location) of the PC board socket (i.e. Numbers 100A to 100N & 500A to 500 N in FIGS. 1, 3, 5, and 8) will facilitate the management of a collection of such systems as a network.

Also, remote allocation of SDM data channels and TDM sub-channel time-slots for a collection of such multiplexer-demultiplexer systems that form a network, will ease the overall management of such systems as a network.

FIG. 34 shows a block diagram for the remote identification of an interface card and remote allocation of SDM data channels and TDM sub-channel time-slots in a fully bi-directional multiplexer-demultiplexer system made up by multiplexer-demultiplexer systems 3401 and 3404. FIGS. 34A and 34B show block diagrams of the two systems 3401 and 3403, respectively. One direction of multiplexed transmission is performed by the set of SDM multiplexer 3411 and SDM demultiplexer 3409, while the opposite direction of multiplexed transmission is performed by the set of SDM multiplexer 3410 and SDM demultiplexer 3412.

A personal computer 3408 with an RD-232C data line is used to monitor the interface card identifications and allocate the SDM data channels and TDM sub-channel time-slots. An interface card 3400 with an RS-232C data line interface 3407 is used to establish a full duplex communication line between the microcontroller 3406 on the interface card 3402, and personal computer 3408.

The RS-232C data line interface and TDM sub-channel selection 3407 uses SDM data channels referenced with circled number 1, and a suitable TDM sub-channel time-slot on the SDM data channels as part of the full duplex communication line between the personal computer 3408 and microcontroller 3406.

The TDM sub-channel selectors 3404 and 3405 on the interface card 3402 complete the full duplex communication line between the personal computer 3408 and microcontroller 3406.

The PC board socket number identifier is provided by a set of 4-bit binary logic levels 3409, 3410, 3411 and 3412 at the socket contacts of socket 100A. The logic levels are provided by wire connections to the appropriate logic levels. The first socket (i.e. 100A and 500A) can be labeled 0001, as illustrated in FIG. 34, and the adjacent sockets sequentially identified by a unique 4-bit binary code.

The binary code 0000 is supplied to the microcontroller 3406 which communicates the code to the personal computer through the RS-232C data line. In this manner, whenever an interface card is installed, its location can be made known to the remote personal computer 3408.

Using the same RS-232C data line, the type of interface card, its SDM data channel and TDM sub-channel time-slot requirements stored in the microcontroller memory, can be communicated to the remote personal computer 3408.

Once the channel requirements of the interface card are known, the remote personal computer 3408 can transmit appropriate digital instruction to the microcontroller through the RS-232C data line, and provide binary code instructions 3413 and 3414 to electronically controlled semiconductor switches such as those illustrated in FIGS. 32 and 33 (i.e. switches 3202, 3302, 1604 and 1804) and complete the allocation of the SDM data channel and TDM sub-channel time-slots.

The embodiments described above offer a multiplexer-demultiplexer system that can multiplex transmit a wide range data signals with differing bit rates. The option of further TDM sub-sub-multiplexing an already sub-multiplexed TDM sub-channel exists. By such sub-sub-multiplexing which can be repeated a number of times, a very wide range of low bit rate data signals can be multiplex transmitted.

The multiplex transmission can be performed synchronously, asynchronously and by asynchronous high speed over-sampling. Note that all 3 approaches can be used at the same time and that data signals with differing bit rates can also be multiplex transmitted at the same time as well.

The flexibility of the multiplexer-demultiplexer system describe herein, arises from the availability of a number of SDM data channels and TDM sub-channel time-slots to every interface card, and from the freedom to allocate these channels as the need arises. The possibility of allocating these channels by remote control further enhances the flexibility of this multiplexer-demultiplexer system.

A person understanding this invention may now conceive of alternative structures and embodiments or variations of the above. All of those which fall within the scope of the claims appended hereto are considered to be part of the present invention.

I claim:

1. A data multiplexer-demultiplexer system comprising:
   (a) a space division multiplexer for receiving a first clock signal at a first clock rate and having a first number of space divided SDM (Space Division Multiplex) data channels, each of said data channels being adapted to carry at said first clock rate a second number of time divided TDM (time Division Multiplex) sub-channels received from one or more external data signal sources;
   (b) means for receiving said first clock signal and generating a group of second clock rate signals defining second clock rates derived from said first clock rate;
   (c) means in communication with said data channels for selecting at least one of said TDM sub-channels by using at least one of said second clock rates, combinations and multiples thereof;
   (d) means for selecting and sampling in said multiplexer (multiplex sampling) at least one data signal received or derived from external signal sources, at said at least one of the second clock rates, combinations and multiples thereof, and placing said selected at least one multiplex sampled data signal into said selected at least one TDM sub-channel;
   (e) means in communication with said data channels for selecting an SDM data channel to which said selected at least one multiplex sampled data signal is applied;
   (f) means in communication with said data channels for applying said selected at least one multiplex sampled data signal to said selected SDM data channel; and
   (g) means for providing when required, at least one of said second clock rates, combinations and multiples thereof to said one or more external data signal sources.

2. A system as defined in claim 1, further comprising:
   (a) a space division demultiplexer having a second number of space divided SDM data channels which is equal to said first number of space divided SDM data channels, said second number of SDM data channels being in one-to one correspondence with said first number of data channels of said space division multiplexer, each of said second number of SDM data channels being adapted to carry at said first clock rate said second number of time divided TDM sub-channels.
   (b) means in communication with said demultiplexer for recovery of said first clock rate, (c) means in communication with said recovery means for generating a further series of second clock rate signals derived from said recovered first clock rate, (d) means in communication with said demultiplexer for bringing into and maintaining synchronization of said further series of second clock rate signals and said TDM sub-channels with said group of second clock rate signals of said space division multiplexer, (e) means in communication with said second number of data channels for further selecting at least one of said second number of SDM data channels corresponding to said selected SDM data channel;

(f) means in communication with said second number of data channels and said further series of second clock rate signals generating means for selecting at least one of said second number of time divided TDM sub-channels using one or more of said further series of second clock rate signals or combinations or multiples thereof;

(g) means in communication with said second number of data channels for extracting at least one sampled multiplexed data signal from said at least one selected TDM sub-channels by demultiplex sampling with one or more of said further series of second clock rate signals or combinations or multiples thereof to provide a demultiplexed sampled data signal or signals;

(h) means in communication with said second number of data channels for reconstructing an original data signal or signals from said demultiplexed sample data signal or signals;

wherein signals from or derived from at least one external data signal source are applied to one or more SDM data channel of the space division multiplexer and multiplex sampled and a resulting sample carried by one or more TDM sub-channels and SDM data channels of the space division multiplexer and delivered to corresponding TDM sub-channels and SDM data channels of the space division demultiplexer, and data signals reproduced from said at least one multiplex sampled data signal.

3. A system as defined in claim 1 further including:

(a) means for selecting and sampling in said multiplexer (multiplex sampling) at said first clock rate or multiples thereof one or more data signals from or derived from external sources;

(b) means in communication with said data channels for selecting at least one of said SDM data channels to which said at least one multiplex sampled data signal is applied;

(c) means in communication with said data channels for applying said multiplex selected and sampled one or more data signals on to said selected SDM data channel; and (d) means in communication with said selected data channel for recovering a sampled data signal or signals from said selected SDM data channel and reconstructing an original data signal received or derived from external signal sources.

4. A system as defined in claim 2 or 3 in which said means for selecting said TDM sub-channel are at least one switch.

5. A system as defined in claim 2 or 3 in which the means for selecting said at least one SDM data channel are at least one switch.

6. A system as defined in claim 1, 2 or 3 in which interface cards and card sockets are used to gain access to said SDM data channels.

7. A system as defined in claim 6 in which an identification code of a card socket is provided to a processor memory on an interface card that is inserted into said socket.

8. A system as defined in claim 7 in which said socket identification code is monitored by a remote processor.

9. A system as defined in claim 6 in which requirements for TDM sub-channels and SDM data channels are prerecorded in a processor memory on an interface card.

10. A system as defined in claim 9 in which SDM data channels and TDM sub-channels allocations are performed remotely by a processor according to said requirements as information stored in said processor on board said interface card.

11. A system as defined in claim 10 in which SDM data channels and said TDM sub-channel usage is monitored by a remote processor.

12. A system as defined in claim 1 in which said means for selecting said TDM sub-channel are at least one switch.

13. A system as defined in claim 12 in which said switch is manually operated.

14. A system as defined in claim 12 in which said switch is electro-mechanically operated.

15. A system as defined in claim 12 in which said switch is electronically operated.

16. A system as defined in claim 12 in which said switch is electronically controlled from a remote location by a processor.

17. A system as defined in claim 1 in which the means for selecting said at least one SDM data channel are at least one switch.

18. A system as defined in claim 17 in which said switch is manually operated.

19. A system as defined in claim 17 in which said switch is electro-mechanically operated.

20. A system as defined in claim 17 in which said switch is electronically operated.

21. A system as defined in claim 17 in which said switch is electronically controlled from a remote location by a processor.

* * * * *